(12) United States Patent
Bai

(10) Patent No.: US 10,454,508 B2
(45) Date of Patent: *Oct. 22, 2019

(54) MULTIWAY SWITCH, RADIO FREQUENCY SYSTEM, AND WIRELESS COMMUNICATION DEVICE

(71) Applicant: Guangdong Oppo Mobile Telecommunications Corp., Ltd., Dongguan, Guangdong (CN)

(72) Inventor: Jian Bai, Guangdong (CN)

(73) Assignee: Guangdong Oppo Mobile Telecommunications Corp., Ltd., Dongguan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/173,482

(22) Filed: Oct. 29, 2018

(65) Prior Publication Data
US 2019/0288718 A1 Sep. 19, 2019

(30) Foreign Application Priority Data

Mar. 16, 2018 (CN) .......................... 2018 1 0220143

(51) Int. Cl.
*H04B 7/00* (2006.01)
*H04B 1/00* (2006.01)
(Continued)

(52) U.S. Cl.
CPC ............. *H04B 1/0064* (2013.01); *H04B 1/44* (2013.01); *H04B 7/0413* (2013.01); *H04L 5/0048* (2013.01)

(58) Field of Classification Search
CPC .. G06F 3/033; H01P 1/10; H03H 7/46; H04B 1/00; H04B 1/28; H04B 1/38; H04B 1/40;
(Continued)

(56) References Cited

U.S. PATENT DOCUMENTS 7,633,357 B2 * 12/2009 Hangai ..................... H01P 1/15
333/103
9,831,940 B2 * 11/2017 Patel ................... H04B 7/18584
(Continued)

FOREIGN PATENT DOCUMENTS

CN       101867402 A    10/2010
CN       202103661 U     1/2012
(Continued)

OTHER PUBLICATIONS

International search report issued in corresponding international application No. PCT/CN2018111031 dated Jan. 18, 2019.
(Continued)

*Primary Examiner* — Shawkat M Ali
(74) *Attorney, Agent, or Firm* — Young Basile Hanlon & MacFarlane, P.C.

(57) ABSTRACT

A multiway switch, a radio frequency system, and a wireless communication system are provided. The multiway switch includes n T ports and four P ports. Each T port is coupled with all of the four P ports, where n is an integer and 4≤n. The multiway switch is configured to be coupled with a radio frequency circuit and an antenna system of an electronic device to implement a preset function of the electronic device. The antenna system includes four antennas corresponding to the four P ports. The preset function is a function of transmitting an SRS through the four antennas in turn.

18 Claims, 23 Drawing Sheets

(51) Int. Cl.
*H04L 5/00* (2006.01)
*H04B 1/44* (2006.01)
*H04B 7/0413* (2017.01)

(58) Field of Classification Search
CPC . H04B 1/44; H04B 1/48; H04B 1/006; H04B 1/401; H04B 1/403; H04B 7/08; H04B 7/108; H04B 7/185; H04B 7/0413; H04B 7/0602; H04B 7/18582; H04B 7/18584; H04L 5/14; H04L 25/0228; H04W 36/00; H04W 36/34; H04W 36/0027; H04W 40/16; H04W 52/52; H04W 72/12; H04W 88/02; H04W 88/06
USPC ......... 333/101, 103; 370/281; 375/219, 260, 375/262, 267, 295, 316; 455/73, 83, 130, 455/552, 552.1, 557
See application file for complete search history.

(56) References Cited

U.S. PATENT DOCUMENTS

| | | |
|---|---|---|
| 2009/0054093 A1 | 2/2009 | Kim et al. |
| 2013/0308554 A1 | 11/2013 | Ngai et al. |
| 2014/0227982 A1 | 8/2014 | Granger-Jones et al. |
| 2014/0293841 A1 | 10/2014 | Rousu |
| 2017/0195004 A1 | 7/2017 | Cheng et al. |
| 2017/0373368 A1* | 12/2017 | Srirattana ................ H01P 5/18 |
| 2018/0152955 A1* | 5/2018 | Park .................. H04W 36/0027 |
| 2018/0205413 A1* | 7/2018 | Patel ....................... H03F 3/195 |

FOREIGN PATENT DOCUMENTS

| | | |
|---|---|---|
| CN | 103905104 A | 7/2014 |
| CN | 105245295 A | 1/2016 |
| CN | 106533526 A | 3/2017 |
| CN | 106559277 A | 4/2017 |
| CN | 106685621 A | 5/2017 |
| CN | 106712795 A | 5/2017 |
| CN | 108199730 A | 6/2018 |
| CN | 108462499 A | 8/2018 |
| CN | 108512556 A | 9/2018 |
| CN | 108512567 A | 9/2018 |
| WO | 2012026601 A1 | 3/2012 |

OTHER PUBLICATIONS

Gao Xiang et al: "Multi-Switch for Antenna Selection in Massive MIMO", 2015 IEEE Global Communications Conference (Globecom), IEEE, Dec. 6, 2015 (Dec. 6, 2015), pp. 1-6, XP032872922, DOI: 10.1109/GLOCOM.2014.7417765 [retrieved on Feb. 23, 2016] Sections I, III.B, III.C; figures 1,2,6.

Extended European search report issued in corresponding European application No. 18202825.8 dated May 28, 2019.

* cited by examiner

US 10,454,508 B2

MULTIWAY SWITCH, RADIO FREQUENCY SYSTEM, AND WIRELESS COMMUNICATION DEVICE

CROSS-REFERENCE TO RELATED APPLICATION(S)

This application claims priority to Chinese Patent Application No. 201810220143.1, filed on Mar. 16, 2018, the entire disclosure of which is hereby incorporated by reference.

TECHNICAL FIELD

This disclosure relates to relates to the field of mobile terminal technology, and particularly to a multiway switch, a radio frequency system, and a wireless communication device.

BACKGROUND

With the widespread use of electronic devices such as smart phones, the smart phone can support an increasing number of applications and is becoming more and more powerful. The smart phone is developing in a diversified and personalized way, becoming indispensable electronic products in users' life. In the fourth generation (4G) mobile communication system, the electronic device generally adopts a single-antenna or dual-antenna radio frequency (RF) system architecture. Currently, in a new radio (NR) system of the fifth generation (5G) mobile communication system, requirements on supporting a four-antenna RF system architecture are proposed.

SUMMARY

Implementations of the disclosure provide a multiway switch, a radio frequency system, and a wireless communication device, to implement a function of transmitting a sounding reference signal (SRS) through four antennas corresponding to four ports in turn (that is, four-port SRS) of an electronic device in the fifth generation new radio (5G NR).

According to a first aspect of implementations of the disclosure, a multiway switch is provided. The multiway switch includes n T ports and four P ports. Each T port is coupled with all of the four P ports, where n is an integer and 4≤n.

The multiway switch is configured to be coupled with a radio frequency circuit and an antenna system of an electronic device to implement a preset function of the electronic device. The antenna system includes four antennas corresponding to the four P ports. The preset function is a function of transmitting an SRS through the four antennas in turn.

According to a second aspect of implementations of the disclosure, a radio frequency system is provided. The radio frequency system includes an antenna system, a radio frequency circuit, and a multiway switch coupled with the radio frequency circuit and the antenna system.

The multiway switch includes n T ports and four P ports. Each T port is coupled with all of the four P ports, where n is an integer and 4≤n. The antenna system includes four antennas corresponding to the four P ports. The multiway switch is configured implement a preset function of transmitting an SRS through the four antennas in turn.

According to a third aspect of implementations of the disclosure, a wireless communication device is provided. The wireless communication device includes an antenna system, a radio frequency transceiver, a radio frequency circuit coupled with the radio frequency transceiver, and a multiway switch coupled with the radio frequency circuit and the antenna system.

The multiway switch includes n T ports and four P ports. The antenna system includes four antennas corresponding to the four P ports. Each T port is coupled with all of the four P ports, where n is an integer and 4≤n≤12. Each P port is configured to be coupled with one antenna of the four antennas. Any two P ports of the four P ports are configured to be coupled with different antennas of the four antennas. The multiway switch is configured to support a preset function of transmitting an SRS through the four antennas in turn.

BRIEF DESCRIPTION OF THE DRAWINGS

To describe technical solutions in implementations of the present disclosure or in the related art more clearly, the following briefly introduces the accompanying drawings required for describing the implementations or the related art. Apparently, the accompanying drawings in the following description only illustrate some implementations of the present disclosure. Those of ordinary skill in the art may also obtain other drawings based on these accompanying drawings without creative efforts.

DETAILED DESCRIPTION

Figure 1:
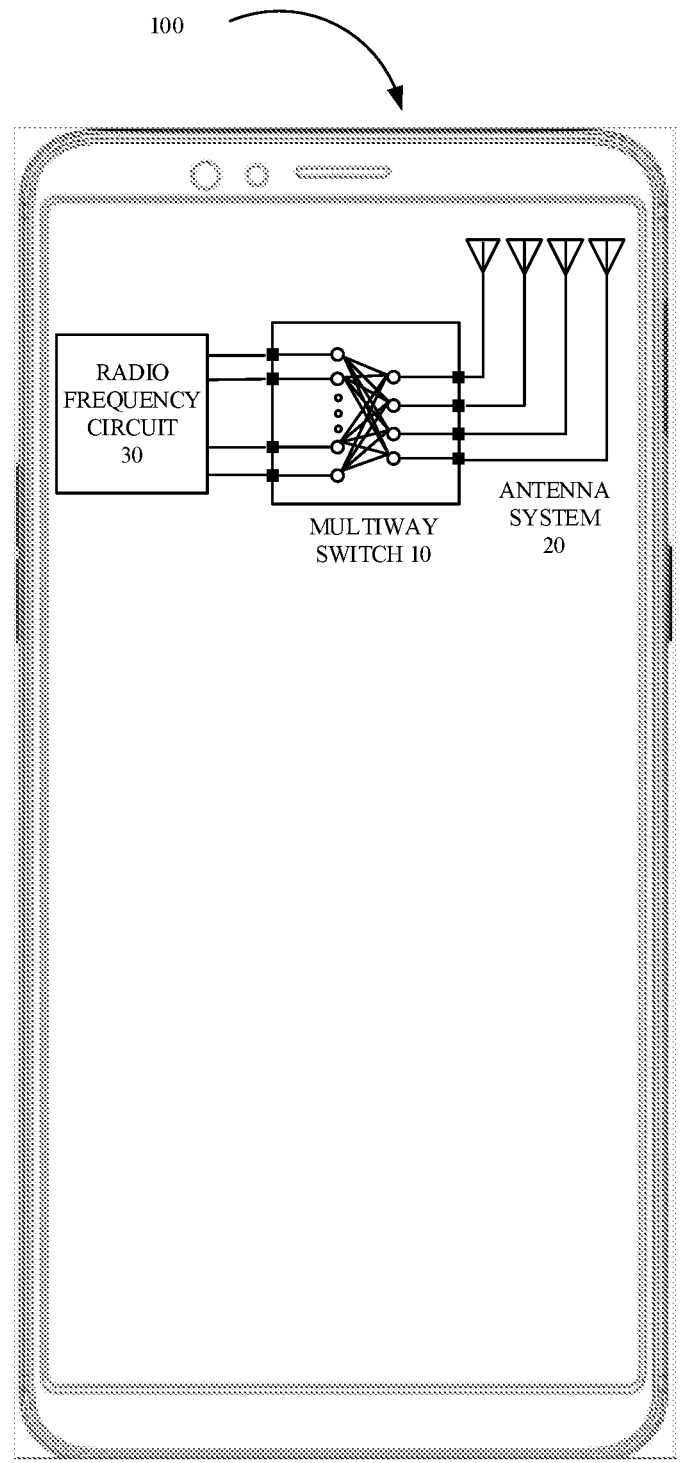
FIG. 1 is a schematic structural diagram illustrating an electronic device according to an implementation of the disclosure.

Technical solutions in implementations of the present disclosure will be described clearly and completely hereinafter with reference to the accompanying drawings described in the previous chapter. Apparently, the described implementations are merely some rather than all implementations of the present disclosure. All other implementations obtained by those of ordinary skill in the art based on the implementations of the present disclosure without creative efforts shall fall within the protection scope of the present disclosure.

The terms "first", "second", and the like used in the specification, the claims, and the accompany drawings of the present disclosure are to distinguish different objects rather than describe a particular order. The terms "include", "comprise", and "have" as well as variations thereof are intended to cover non-exclusive inclusion. For example, a process, method, system, product, or apparatus including a series of steps or units is not limited to the listed steps or units. Instead, it can optionally include other steps or units that are not listed; alternatively, other steps or units inherent to the process, method, product, or device can also be included.

The term "embodiment" or "implementation" referred to herein means that a particular feature, structure, or characteristic described in conjunction with the implementation may be contained in at least one implementation of the present disclosure. The phrase appearing in various places in the specification does not necessarily refer to the same implementation, nor does it refer to an independent or alternative implementation that is mutually exclusive with other implementations. It is explicitly and implicitly understood by those skilled in the art that an implementation described herein may be combined with other implementations.

The electronic device involved in the implementations of the present disclosure may include various handheld devices, in-vehicle devices, wearable devices, computing devices that have wireless communication functions or other processing devices connected to the wireless modem, as well as various forms of user equipments (UE), mobile stations (MS), terminal devices, and the like. For the convenience of description, the above-mentioned devices are collectively referred to as an electronic device.

At present, sounding reference signal (SRS) transmission via four antennas switching of a mobile phone is a mandatory option for China mobile communications corporation (CMCC) in the China mobile fifth generation (5G) Scale Test Technical White Paper_Terminal, which is optional in the 3rd generation partnership project (3GPP). Its main purpose is for a base station to determine quality and parameters of four channels via measuring an uplink signal of the four antennas of the mobile phone, to perform a beamforming of a downlink massive multi-input multi-output (MIMO) antenna array on the four channels according to a channel reciprocity, and finally to obtain the best data transmission performance for a downlink 4×4 MIMO.

In order to satisfy requirements of SRS transmission via four antennas switching, implementations of the present disclosure provide a radio frequency (RF) architecture based on a 4PnT antenna switch. Compared with a 3P3T/DPDT/multiway small switch switching scheme, the present switching scheme can reduce the number of series switches in signal transmit paths and signal receive paths of a radio frequency system (all or part of switches are integrated into the 4PnT switch), thereby reducing link loss and optimizing the overall transmission and reception performance of the terminal. The implementations of the present disclosure are described in detail below.

FIG. 1 is a schematic structural diagram illustrating a multiway switch 10 according to an implementation of the disclosure. The multiway switch 10 includes n T ports and four P ports. Each of the n T ports is coupled with all of the four P ports (that is, fully-coupled), where n is an integer and 4≤n. The multiway switch 10 is applicable to an electronic device 100. The electronic device 100 includes an antenna system 20 and a radio frequency circuit 30. The antenna system 20 includes four antennas. The four antennas correspond to the four P ports; specifically, the four antennas and the four P ports are in one-to-one correspondence.

The multiway switch 10 is configured to be coupled with the radio frequency circuit 30 and the antenna system 20 to implement a preset function of the electronic device 100. The preset function is a function of transmitting an SRS through the four antennas corresponding to the four P ports in turn, which can be understood as a four-port SRS function.

The electronic device further includes a radio frequency transceiver. The radio frequency transceiver is coupled with the radio frequency circuit and constitutes the radio frequency system of the electronic device together with the radio frequency circuit, the multiway switch, and the antenna system.

Figure 2:
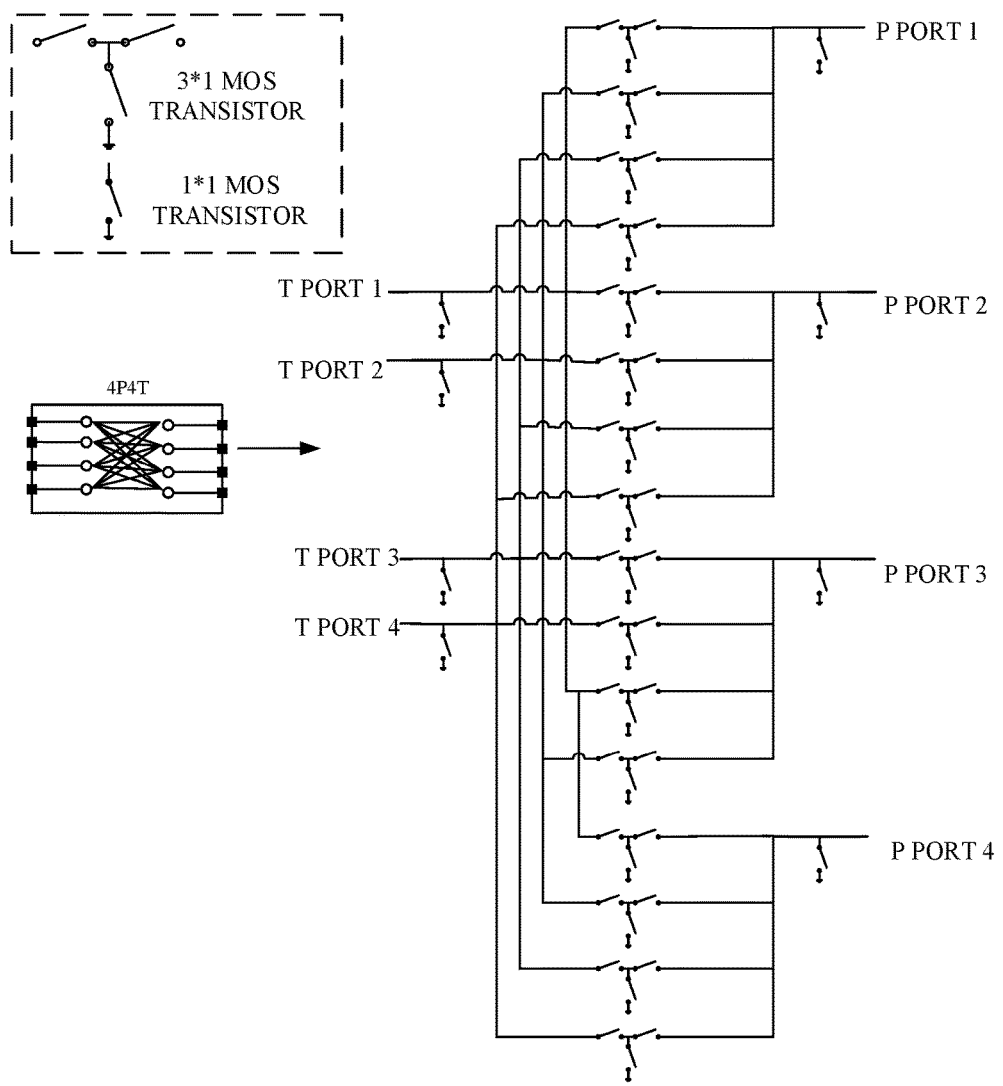
FIG. 2 is a schematic structural diagram illustrating a fully coupled 4P4T switch according to an implementation of the disclosure.

"P port" in the disclosure is the abbreviation of "pole port", which refers to ports coupled with antennas of the multiway switch. "T port" in the disclosure is the abbreviation of "throw port", which refers to ports coupled with radio frequency modules of the multiway switch. The multiway switch is a 4P4T switch for example. As illustrated in FIG. 2 for example, the four P ports are P port 1, P port 2, P port 3, and P port 4. "Module" herein can refer to circuits and any combination of related components.

The concept of coupling, full coupling, or other kinds of coupling between the T ports and the P ports of the multiway switch described in the implementations of the disclosure refers to a state in which the T ports are coupled with the P ports through first switch transistors. One T port or one P port may be one port of a second switch transistor. The first switch transistors are configured to control a unidirectional conduction state between the T ports and the P ports (including a unidirectional conduction state from the T ports to the P ports and a unidirectional conduction state from the P ports to the T ports). The first switch transistors can be, for example, a switch array including three metal-oxide-semiconductor (MOS) transistors. When the first switch transistor is disconnected and not grounded, parasitic parameters will greatly affect performance of other connected ports. Therefore, the first switch transistor is implemented with three MOS transistors, where the three MOS transistors can be in a common source connection, that is, coupled at a common source. When the first switch transistor is disconnected, two MOS transistors at two ends are disconnected and one MOS transistor in the middle is grounded. The second switch transistor is configured to enable a corresponding port (T port or P port) and can be, for example, a MOS transistor. The specific configurations of the first switch transistor and the second switch transistor are not limited herein. As one implementation, the electronic device can control paths between the T ports and the P ports to switch on through the first switch transistors. As one implementation, the electronic device can be provided with a dedicated controller to be coupled with switch transistors of the multiway switch.

The expression of "transmitting an SRS through the four antennas corresponding to the four P ports in turn" refers to a process in which the electronic device interacts with a base station based on polling mechanism to determine quality of an uplink channel corresponding to each antenna.

The electronic device may be a mobile phone or other terminal devices supporting the fifth generation new radio (5G NR), such as a customer premise equipment (CPE) or a mobile wireless-fidelity (MIFI).

As each of the n T ports is fully coupled with the four P ports, the functions of part or all of the switches connected in series in the signal receive paths or the signal transmit paths of the radio frequency system can be implemented through the multiway switch. In this way, the number of independent switches connected in series in the signal receive paths or the signal transmit paths can be reduced. The number of built-in field-effect transistors (FET) of the multiway switch in different full coupling states will be described in detail hereinafter.

For example, assume n=4 (that is, the multiway switch includes four T ports, i.e., T port 1, T port 2, T port 3, and T port 4) and the multiway switch includes field-effect transistors; among the four T ports, if each T port is fully coupled with the four P ports, as illustrated in FIG. 2 of the schematic structural diagram of the multiway switch, the number of the field-effect transistors of the multiway switch is 4+4*4*3+4=56.

For another example, assume n=5 (that is, the multiway switch includes five T ports) and the multiway switch includes field-effect transistors; among the five T ports, if each T port is fully coupled with the four P ports, the number of the field-effect transistors of the multiway switch is 5+5*4*3+4=69.

For still another example, assume n=12 (that is, the multiway switch includes twelve T ports) and the multiway switch includes field-effect transistors; among the twelve T ports, if each T port is fully coupled with the four P ports, the number of the field-effect transistors of the multiway switch is 12+12*4*3+4=160.

In this implementation, the electronic device includes the antenna system, the radio frequency circuit, and the multiway switch. The antenna system includes four antennas and the multiway switch includes n T ports and four P ports. As each of the n T ports is fully coupled with the four P ports, the multiway switch is configured to be coupled with the radio frequency circuit and the antenna system, to implement the preset function of transmitting an SRS through the four antennas corresponding to the four P ports in turn of the electronic device.

In one possible implementation, 4≤n≤12. Each of the four P ports is coupled with a corresponding antenna, specifically, one P port is coupled with one antenna and any two P ports are coupled with different antennas.

When the electronic device is operable in a downlink (DL) 4*4 MIMO, each of the T ports is coupled with a corresponding P port in four downlink paths at the same frequency band.

Considering that, in the 5G NR, the electronic device is at most operable in a dual-frequency uplink UL2*2 MIMO and downlink DL4*4 MIMO (simplified as a dual-frequency dual-transmit mode, the related descriptions will be similarly simplified hereinafter), that is, logically corresponds to eight signal receive paths and four signal transmit paths, which means that twelve T ports are included at most, accordingly, the value of n is less than or equal to 12.

In this implementation, as each of the four P ports is coupled with a corresponding antenna in the multiway switch, it is ensured that the downlink DL4*4MIMO can be in a normal state. In addition, since 4≤n≤12, redundant ports can be avoided, and thus cost and structural complexity can be reduced.

As mentioned before, 4≤n≤12, with the understanding that the principles of the technical schemes provided herein can apply more generally to any possible configuration of T pots and P ports, n can have multiple possible values without conflict. The following aspects of the disclosure contribute to the advantages of the disclosure and each will be described in detail.

Terms referred to herein will be given below.

Single-frequency single-transmit mode: refer to an operating mode in which the electronic device can support single frequency band-one uplink (UL) transmit path or single frequency band-four downlink (DL) receive paths.

Single-frequency dual-transmit mode: refer to an operating mode in which the electronic device can support single frequency band-two UL transmit paths or single frequency band-four DL receive paths.

Dual-frequency single-transmit mode: refer to an operating mode in which the electronic device can support dual frequency band-one UL transmit path or dual frequency band-four DL receive paths.

Dual-frequency dual-transmit mode: refer to an operating mode in which the electronic device can support dual frequency band-two UL transmit paths or dual frequency band-four DL receive paths.

4PnT, n is an integer and 4≤n≤12: refers to a specific multiway switch configuration in which the multiway switch is structured to have four P ports and n T ports.

In one possible implementation, n=4 (that is, the multiway switch includes four T ports). The electronic device is operable in at least one mode of: the single-frequency single-transmit mode, the single-frequency dual-transmit mode, the dual-frequency single-transmit mode, and the dual-frequency dual-transmit mode.

Figure 3A:
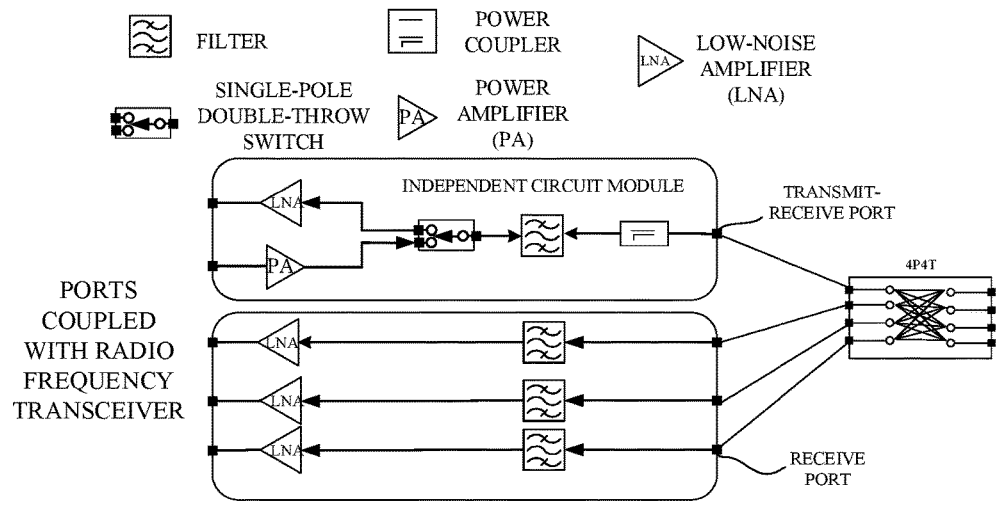
FIG. 3A is a schematic structural diagram illustrating a radio frequency circuit adapted to a fully coupled 4P4T switch of an electronic device operable in a single-frequency single-transmit mode according to an implementation of the disclosure.

In the case that the electronic device is operable in the single-frequency single-transmit mode, the radio frequency circuit of the electronic device logically includes four receiver circuits (can be comprehended as a circuit for receiving and/or processing signals) and one transmitter circuit (can be comprehended as a circuit for transmitting and/or processing signals). Since each of the four T ports is fully coupled with the four P ports of the multiway switch, the one transmitter circuit and any one of the four receiver circuits can be integrated into a transceiver circuit (can be comprehended as a circuit for transmitting, receiving, and/or processing signals) through a single-pole double-throw (SPDT) switch. The transceiver circuit has one port coupled with one of the four T ports, and the remaining three receiver circuits are coupled in one-to-one correspondence with the remaining three T ports. Therefore, when the electronic device is provided with four DL receive paths, coupling between T ports and P ports in three DL receive paths corresponding to the three receiver circuits needs to be in one-to-one correspondence. Coupling manners between the T ports and the P ports are not limited herein. It can be understood that, due to full coupling between the T ports and the P ports, coupling flexibility between the T ports and the P ports are significantly improved. As illustrated in FIG. 3A, the receiver circuit may include a low noise amplifier (LNA) and a filter, where the LNA is coupled with the filter, the filter is coupled with one of the four T ports, and the LNA has an output port that is coupled with a corresponding port of the radio frequency transceiver. The transmitter circuit may include a power amplifier (PA), a filter, and a power coupler, where the PA is coupled with the filter and the filter is coupled with the power coupler. The receiver circuit and the transmitter circuit can be integrated into a transceiver circuit through a SPDT switch. The transceiver circuit may include the LNA, the PA, the SPDT switch, the filter, and the power coupler. The LNA and the PA are coupled in parallel with two ports of the SPDT switch; the remaining port of the SPDT is coupled with the filter; the filter is coupled with the power coupler; the power coupler is coupled with one of the four T ports; and the output port of the LNA and the input port of the PA are coupled with the corresponding ports of the radio frequency transceiver.

Figure 3B:
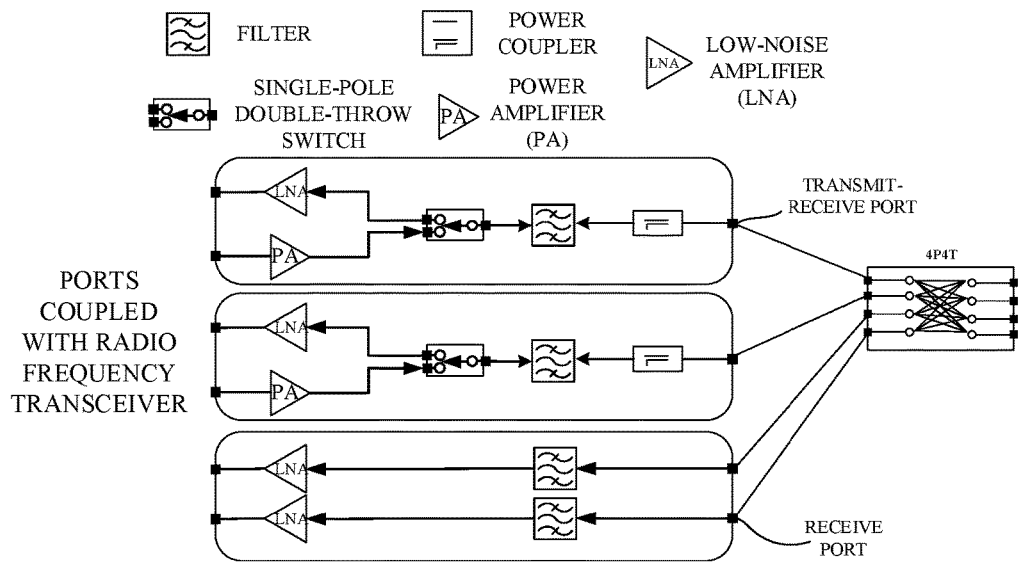
FIG. 3B is a schematic structural diagram illustrating a radio frequency circuit adapted to a fully coupled 4P4T switch of an electronic device operable in a single-frequency dual-transmit mode according to an implementation of the disclosure.

In the case that the electronic device is operable in the single-frequency dual-transmit mode, the radio frequency circuit of the electronic device logically includes four receiver circuits and two transmitter circuits. Since each of the four T ports is fully coupled with the four P ports of the multiway switch, one of the two transmitter circuits and one of the four receiver circuits are integrated into a transceiver circuit, and the other one of the two transmitter circuits and another one of the four receiver circuits are integrated into another transceiver circuit. The two transceiver circuits have ports that are coupled with two T ports of the four T ports (in one-to-one correspondence), and the remaining two receiver circuits are coupled with the remaining two T ports (in one-to-one correspondence). In addition, the two transceiver circuits are in different independent circuit modules, as illustrated in FIG. 3B. The specific configuration of the transmitter circuit and the receiver circuit is similar to the foregoing implementations and will not be described herein again.

Figure 3C:
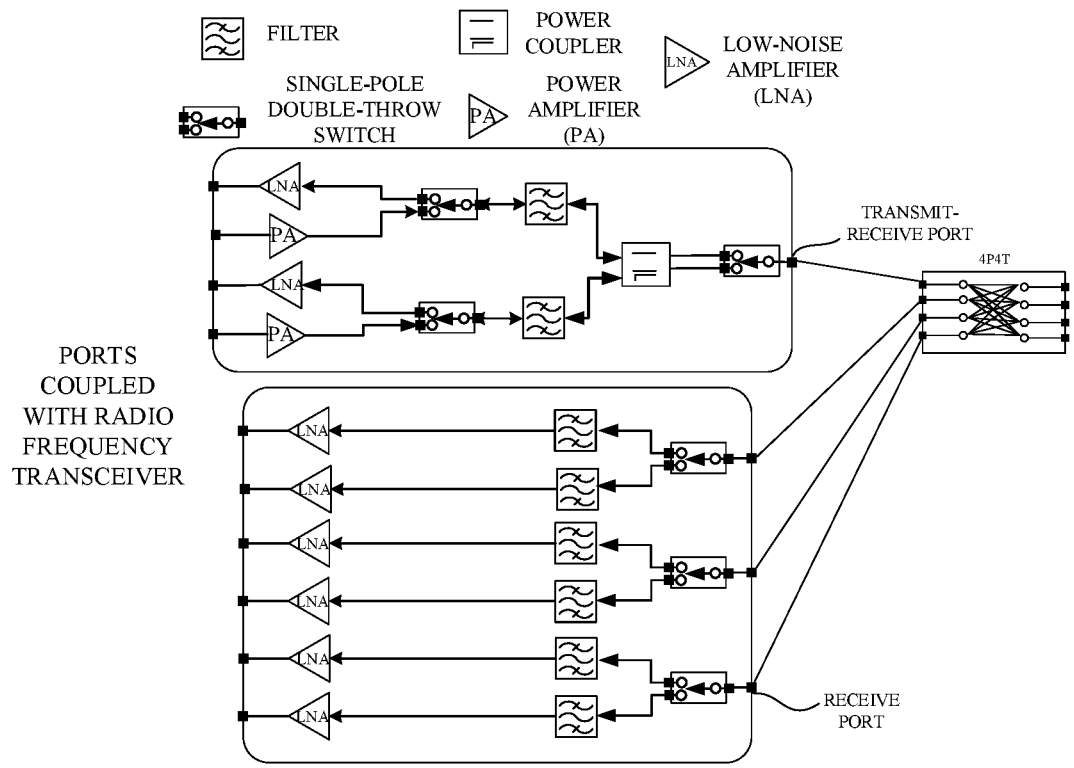
FIG. 3C is a schematic structural diagram illustrating a radio frequency circuit adapted to a fully coupled 4P4T switch of an electronic device operable in a dual-frequency single-transmit mode according to an implementation of the disclosure.

In the case that the electronic device is operable in the dual-frequency single-transmit mode, the radio frequency circuit of the electronic device logically includes eight receiver circuits and two transmitter circuits. Since each of the four T ports is fully coupled with the four P ports of the multiway switch, one of the two transmitter circuits and one of the eight receiver circuits are integrated into a transceiver circuit, and the other one of the two transmitter circuits and another one of the eight receiver circuits are integrated into another transceiver circuit. The above two transceiver circuits are integrated into a transceiver integrated circuit (can be comprehended as an integrated circuit for transmitting, receiving, and/or processing signals) through a SPDT switch and share the same power coupler. The SPDT switch has a port coupled with one of the four T ports. The remaining six receiver circuits are divided into three groups. Each group includes two receiver circuits at different frequency bands, and the two receiver circuits in each group are integrated into a receiver integrated circuit (can be comprehended as an integrated circuit for receiving and/or processing signals) through a SPDT switch. The SPDT switch has a port coupled with one of the remaining three T ports, as illustrated in FIG. 3C. The transceiver integrated circuit herein includes two transceiver circuits with the shared power coupler. As one implementation, the two transceiver circuits are integrated with the shared power coupler; the shared power coupler is coupled with a SPDT switch; and the SPDT switch has a port coupled with one of the four T ports.

Figure 3D:
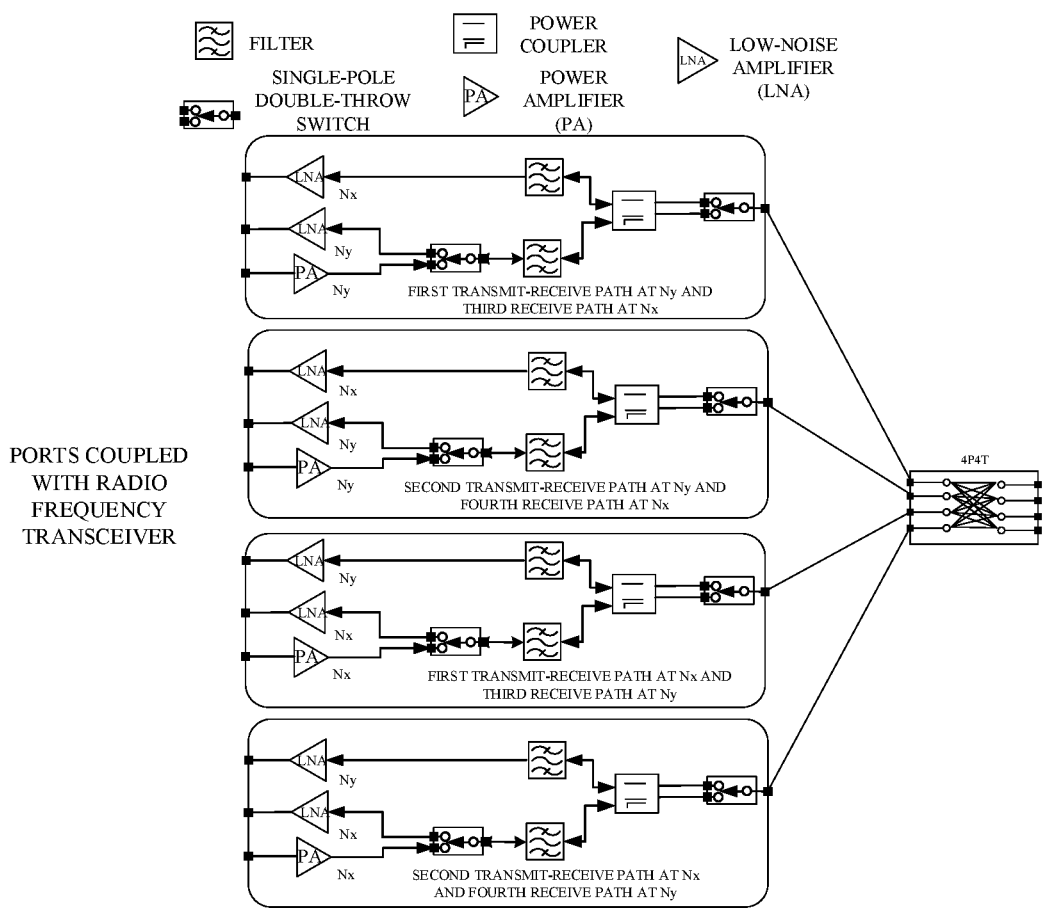
FIG. 3D is a schematic structural diagram illustrating a radio frequency circuit adapted to a fully coupled 4P4T switch of an electronic device operable in a dual-frequency dual-transmit mode according to an implementation of the disclosure.

In the case that the electronic device is operable in the dual-frequency dual-transmit mode, the radio frequency circuit of the electronic device logically includes eight receiver circuits and four transmitter circuits. Since each of the four T ports is fully coupled with the four P ports of the multiway switch, the eight receiver circuits and the four transmitter circuits can be divided into four groups. Each group includes one receiver circuit and one transmitter circuit at the same frequency band and another one receiver circuit at a frequency band different from the above frequency band (in other words, at a different frequency band). The receiver circuit and the transmitter circuit at the same frequency band are integrated into a transceiver circuit, and the transceiver circuit and the another one receiver circuit at a different frequency band are further integrated into a different frequency (DF) transceiver integrated circuit (can be comprehended as an integrated circuit for transmitting, receiving, and/or processing signals), to be coupled with a corresponding T port. As illustrated in FIG. 3D, Nx represents a first frequency band and Ny represents a second frequency band. In the different frequency transceiver integrated circuit, the filter of the transceiver circuit and the filter of the another one receiver circuit are coupled in parallel with the power coupler, the power coupler is coupled with the SPDT switch, and the SPDT switch has a port coupled with one of the four T ports.

It can be understood that, for transmit-receive integrated paths of the radio frequency system of the electronic device, the transmit-receive integrated paths can include two independent switches (a SPDT switch and a 4P4T switch). For receive paths, the receive paths can include one single independent switch (a 4P4T switch), or include two independent switches (a 4P4T switch and a SPDT switch). That is to say, by integrating more switch functions of the transmit paths and the receive paths into the 4P4T switch, the number of independent switches in the transmit paths and the receive paths can be effectively reduced.

It can be concluded that for the case where n=4, the multiway switch of the implementation of the disclosure can enable the electronic device to be operable in the single-frequency single-transmit mode, the single-frequency dual-transmit mode, the dual-frequency single-transmit mode, or the dual-frequency dual-transmit mode. It is beneficial to simplifying the RF architecture of the electronic device supporting four-port SRS switching in the 5G NR, reducing the number of switches in transmit paths and receive paths and reducing path loss, thereby improving transmit power/ sensitivity, data transmission rate in the 5G NR, and uplink and downlink coverage of the mobile phone, and reducing power consumption.

In one possible implementation, n=5 (that is, the multiway switch includes five T ports). The electronic device is operable in at least one of: the single-frequency single-transmit mode, the single-frequency dual-transmit mode, the dual-frequency single-transmit mode, and the dual-frequency dual-transmit mode.

Figure 4A:
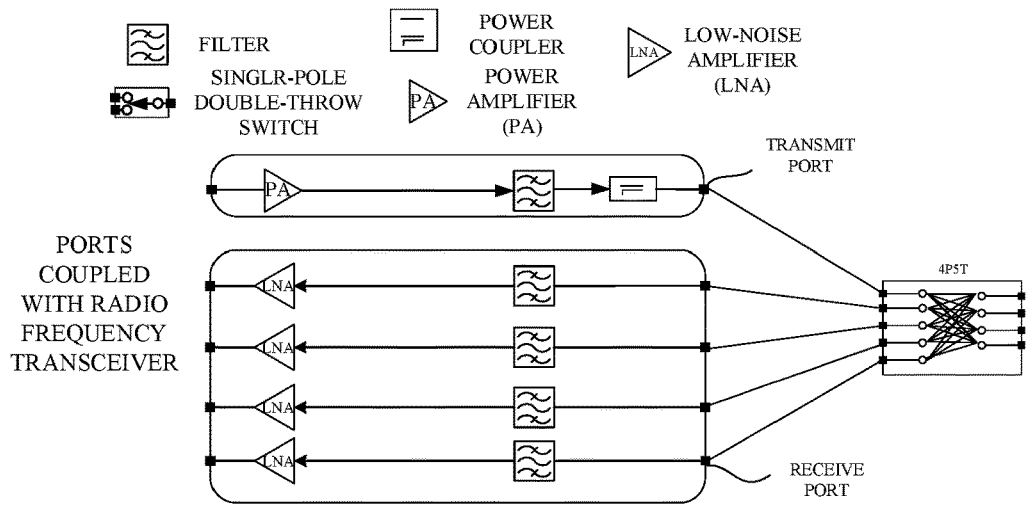
FIG. 4A is a schematic structural diagram illustrating a radio frequency circuit adapted to a fully coupled 4P5T switch of an electronic device operable in a single-frequency single-transmit mode according to an implementation of the disclosure.

In the case that the electronic device is operable in the single-frequency single transmit mode, the radio frequency circuit of the electronic device logically includes four receiver circuits and one transmitter circuit. Since each of the five T ports of the multiway switch is fully coupled with the four P ports of the multiway switch, as illustrated in FIG. 4A, the transmitter circuit and the four receiver circuits have ports that are coupled in one-to-one correspondence with the five T ports of the multiway switch.

Figure 4B:
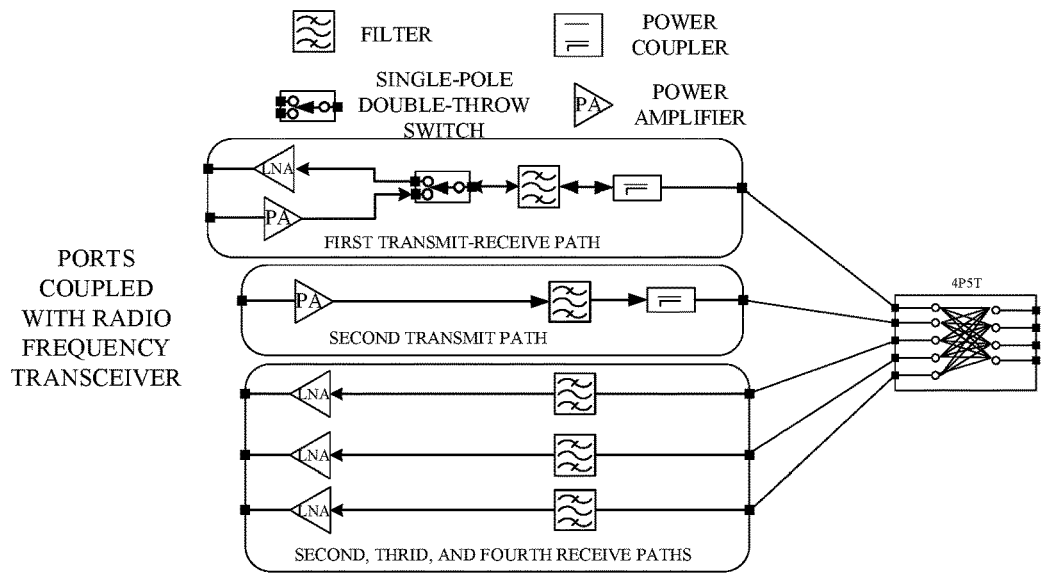
FIG. 4B is a schematic structural diagram illustrating a radio frequency circuit adapted to a fully coupled 4P5T switch of an electronic device operable in a single-frequency dual-transmit mode according to an implementation of the disclosure.

In the case that the electronic device is operable in the single-frequency dual-transmit mode, the radio frequency circuit of the electronic device logically includes four receiver circuits and two transmitter circuits. Since each of the five T ports of the multiway switch is fully coupled with the four P ports of the multiway switch, one of the two transmitter circuits and one of the four receiver circuits can be integrated into a transceiver circuit and the transceiver circuit is coupled with one of the five T ports of the multiway switch; the remaining one transmitter circuit is coupled with another one T port of the five T ports of the multiway switch; the remaining three receiver circuits are respectively coupled with the remaining three T ports of the five T ports of the multiway switch (in one-to-one correspondence). As illustrated in FIG. 4B, the configuration of the transceiver circuit, the receiver circuit, and the transmitter circuit is similar to the foregoing implementations and will not be described herein again.

Figure 4C:
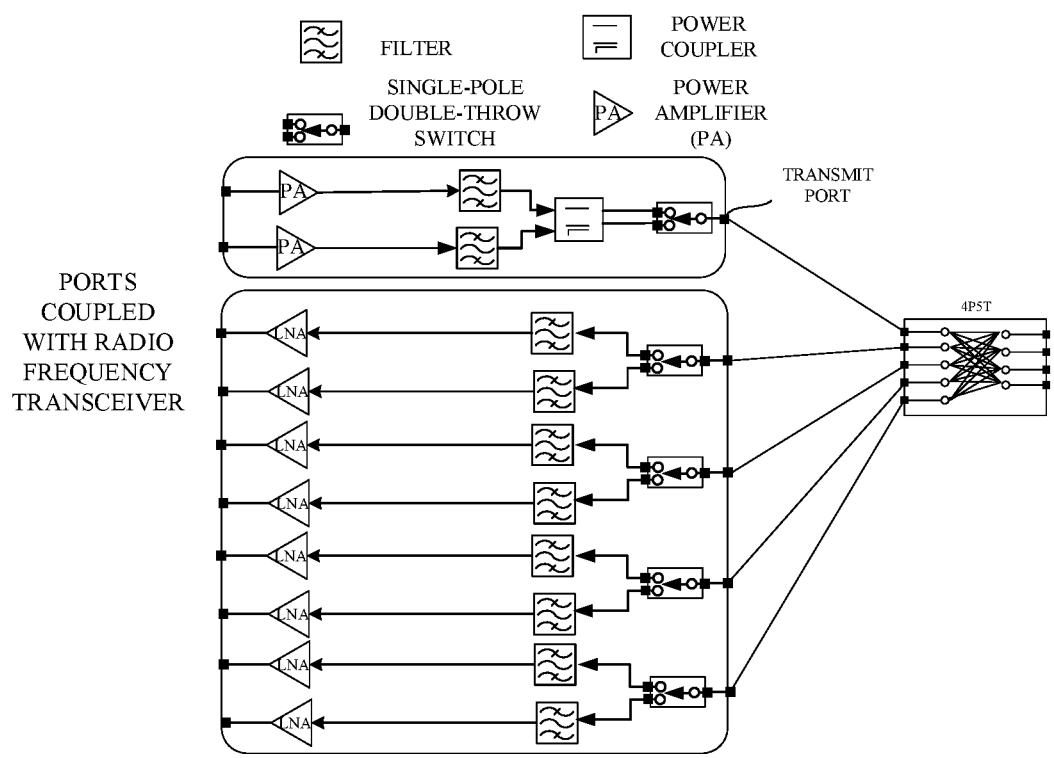
FIG. 4C is a schematic structural diagram illustrating a radio frequency circuit adapted to a fully coupled 4P5T switch of an electronic device operable in a dual-frequency single-transmit mode according to an implementation of the disclosure.

In the case that the electronic device is operable in the dual-frequency single-transmit mode, the radio frequency circuit of the electronic device logically includes eight receiver circuits and two transmitter circuits. Since each of the five T ports of the multiway switch is fully coupled with the four P ports of the multiway switch, the two transmitter circuits can be integrated into a transmitter integrated circuit (can be comprehended as an integrated circuit for transmitting and/or processing signals) through a SPDT switch and share the same power coupler. The transmitter integrated circuit is coupled with one of the five T ports of the multiway switch. The eight receiver circuits are divided into four groups. Each group includes two receiver circuits at different frequency bands. The two receiver circuits are integrated into a receiver integrated circuit through a SPDT switch, and the receiver integrated circuit is coupled with one of the remaining four T ports of the multiway switch, as illustrated in FIG. 4C.

Figure 4D:
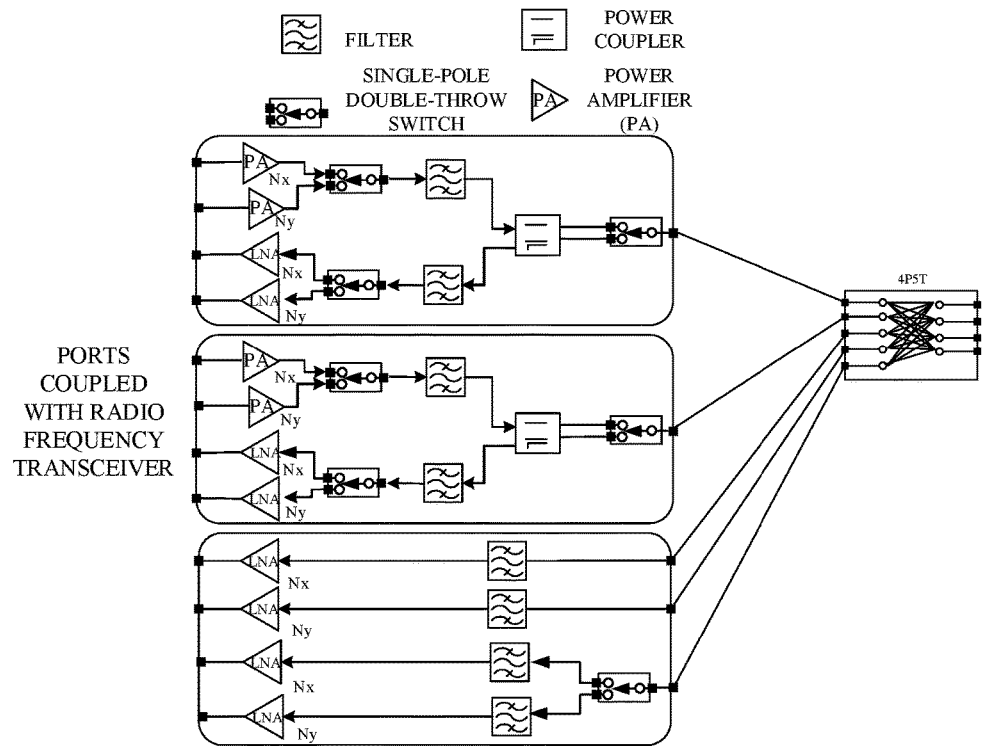
FIG. 4D is a schematic structural diagram illustrating a radio frequency circuit adapted to a fully coupled 4P5T switch of an electronic device operable in a dual-frequency dual-transmit mode according to an implementation of the disclosure.

In the case that the electronic device is operable in the dual-frequency dual-transmit mode, the radio frequency circuit of the electronic device logically includes eight receiver circuits and four transmitter circuits. Since each of the five T ports of the multiway switch is fully coupled with the four P ports of the multiway switch, the four transmitter circuits and four of the eight receiver circuits can be divided into two groups. Each group includes two transmitter circuits at different frequency bands and two receiver circuits at different frequency bands. The two transmitter circuits and the two receiver circuits can be integrated into two transceiver circuits, to be further integrated into a first transceiver integrated circuit. The first transceiver integrated circuit is similar to that illustrated in FIG. 3C and will not be described herein again. Alternatively, the two transmitter circuits can be integrated into a transmitter integrated circuit and the two receiver circuits can be integrated into a receiver integrated circuit. The transmitter integrated circuit and the receiver integrated circuit can be further integrated into a second transceiver integrated circuit. The second transceiver integrated circuit is obtained by the integration between the transmitter integrated circuit and the receiver integrated circuit through a SPDT switch. The second transceiver integrated circuit has a port coupled with one of the five T ports. The remaining four receiver circuits are divided into three groups. A first group and a second group each include one receiver circuit, and a third group includes two receiver circuits at different frequency bands. The receiver circuit in the first group has a port coupled with one of the remaining three T ports and the receiver circuit in the second group has a port coupled with one of the remaining two T ports. Similarly, the two receiver circuits at different frequency bands in the third group are integrated into a receiver integrated circuit through a SPDT switch, and the receiver integrated circuit has a port coupled with the remaining one T port of the multiway switch, as illustrated in FIG. 4D. Nx and Ny herein represent two different frequency bands.

It can be understood that, for the transmit paths and the receive paths of the radio frequency system of the electronic device, the transmit paths can include one single independent switch (a 4P5T switch), or two independent switches (a SPDT switch and a 4P5T switch), and the receive paths can include one single independent switch (a 4P5T switch), or two independent switches (a SPDT switch and a 4P5T switch). That is to say, by integrating more switch functions of the transmit paths and the receive paths into the 4P5T switch, the number of independent switches in the transmit paths and the receive paths can be effectively reduced.

It can be concluded that for the case where n=5, the multiway switch of the implementation of the disclosure can enable the electronic device to be operable in the single-frequency single-transmit mode, the single-frequency dual-transmit mode, the dual-frequency single-transmit mode or the dual-frequency dual-transmit mode. It is beneficial to simplifying the RF architecture of the electronic device supporting four-port SRS switching in the 5G NR, reducing the number of switches in transmit paths and receive paths and reducing path loss, thereby improving transmit power/sensitivity, data transmission rate in the 5G NR, and uplink and downlink coverage of the mobile phone, and reducing power consumption.

In one possible implementation, n=6 (that is, the multiway switch includes six T ports). The electronic device is operable in at least one of: the single-frequency dual-transmit mode, the dual-frequency single-transmit mode, and the dual-frequency dual-transmit mode.

Figure 5A:
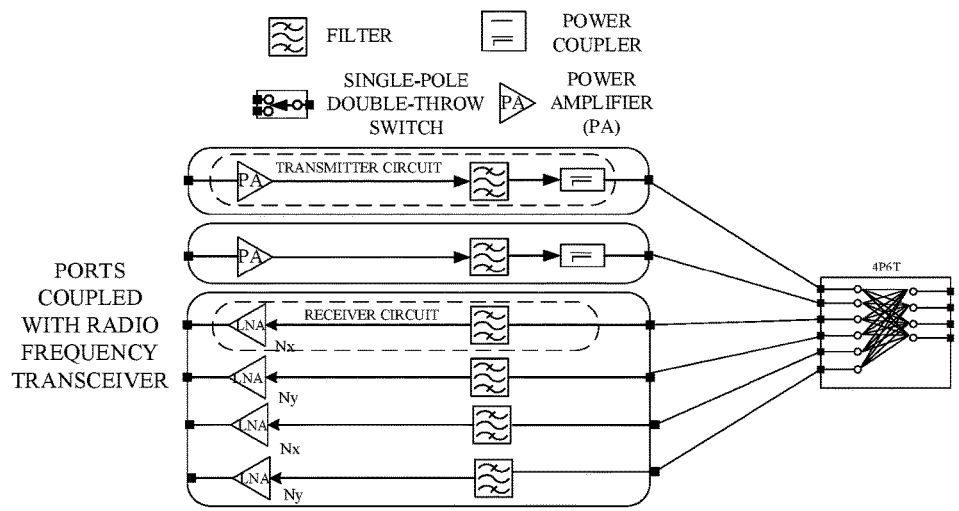
FIG. 5A is a schematic structural diagram illustrating a radio frequency circuit adapted to a fully coupled 4P6T switch of an electronic device operable in a single-frequency dual-transmit mode according to an implementation of the disclosure.

In the case that the electronic device is operable in the single-frequency dual-transmit mode, the radio frequency circuit of the electronic device logically includes four receiver circuits and two transmitter circuits. Since each of the six T ports of the multiway switch is fully coupled with the four P ports of the multiway switch, the two transmitter circuits and the four receiver circuits each have a port coupled with one of the six T ports of the multiway switch, as illustrated in FIG. 5A.

Figure 5B:
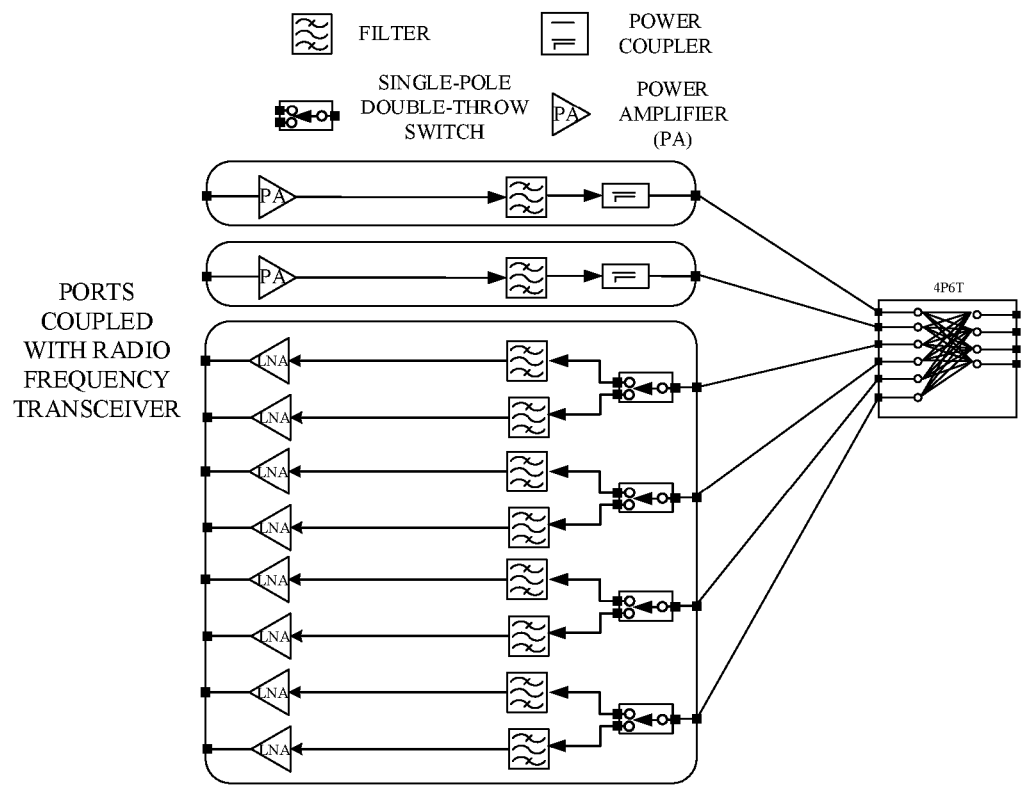
FIG. 5B is a schematic structural diagram illustrating a radio frequency circuit adapted to a fully coupled 4P6T switch of an electronic device operable in a dual-frequency single-transmit mode according to an implementation of the disclosure.

In the case that the electronic device is operable in the dual-frequency single-transmit mode, the radio frequency circuit of the electronic device logically includes eight receiver circuits and two transmitter circuits. Since each of the six T ports of the multiway switch is fully coupled with the four P ports of the multiway switch, each of the two transmitter circuits is coupled with one of the six T ports of the multiway switch. The eight receiver circuits are divided into four groups. Each group includes two receiver circuits at different frequency bands and the two receiver circuits are integrated into a receiver integrated circuit through a SPDT switch. The receiver integrated circuit is coupled with one of the remaining four T ports of the multiway switch, as illustrated in FIG. 5B. It should be noted that, the specific configuration of the radio frequency circuit adapted to the electronic device includes but is not limited to the configuration described in this implementation of the disclosure.

Figure 5C:
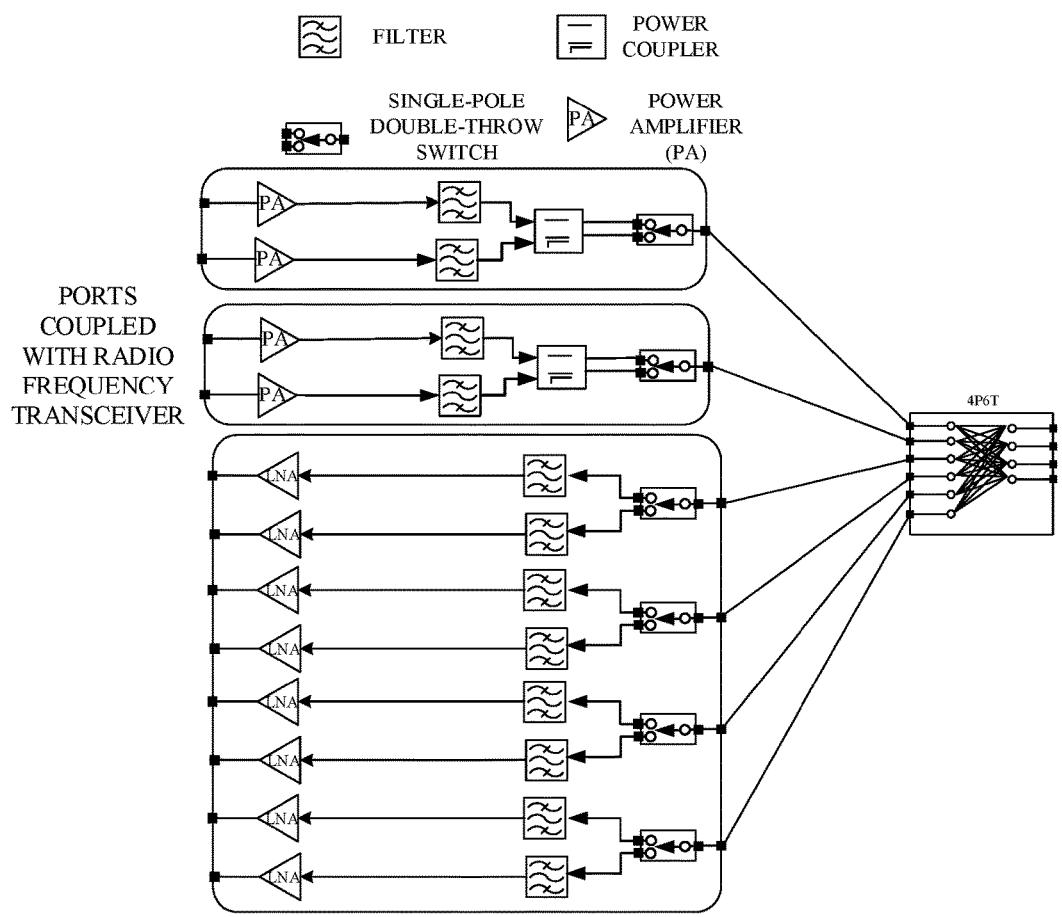
FIG. 5C is a schematic structural diagram illustrating a radio frequency circuit adapted to a fully coupled 4P6T switch of an electronic device operable in a dual-frequency dual-transmit mode according to an implementation of the disclosure.

In the case that the electronic device is operable in the dual-frequency dual-transmit mode, the radio frequency circuit of the electronic device logically includes eight receiver circuits and four transmitter circuits. Since each of the six T ports of the multiway switch is fully coupled with the four P ports of the multiway switch, the four transmitter circuits can be divided into two groups, and each group includes two transmitter circuits at different frequency bands. The two transmitter circuits at different frequency bands are integrated into a transmitter integrated circuit through a SPDT switch, and the transmitter integrated circuit is coupled with one of the six T ports of the multiway switch. The eight receiver circuits can be divided into four groups, and each group includes two receiver circuits at different frequency bands. The two receiver circuits at different frequency bands are integrated into a receiver integrated circuit through a SPDT switch, and the receiver integrated circuit is coupled with one of the remaining four T ports of the multiway switch, as illustrated in FIG. 5C. It should be noted that, the specific configuration of the radio frequency circuit adapted to the electronic device includes but is not limited to the configuration described in this implementation of the disclosure.

It can be understood that, for the transmit paths and the receive paths of the radio frequency system of the electronic device, the transmit paths can include one single independent switch (a 4P6T switch), or two independent switches (a SPDT switch and a 4P6T switch), and the receive paths can include one single independent switch (a 4P6T switch), or two independent switches (a SPDT switch and a 4P6T switch). That is to say, by integrating more switch functions of the transmit paths and the receive paths into the 4P6T switch, the number of independent switches in the transmit paths and the receive paths can be effectively reduced.

It can be concluded that for the case where n=6, the multiway switch of the implementation of the disclosure can enable the electronic device to be operable in the single-frequency dual-transmit mode, the dual-frequency single-transmit mode, or the dual-frequency dual-transmit mode. It is beneficial to simplifying the RF architecture of the electronic device supporting four-port SRS switching in the 5G NR, reducing the number of switches in transmit paths and receive paths and reducing path loss, thereby improving transmit power/sensitivity, data transmission rate in the 5G NR, and uplink and downlink coverage of the mobile phone, and reducing power consumption.

In one possible implementation, n=7 (that is, the multiway switch includes seven T ports). The electronic device is operable in at least one of: the dual-frequency single-transmit mode and the dual-frequency dual-transmit mode.

The number of MOS transistors corresponding to the multiway switch is 7+7*4*3+4=95.

Figure 6A:
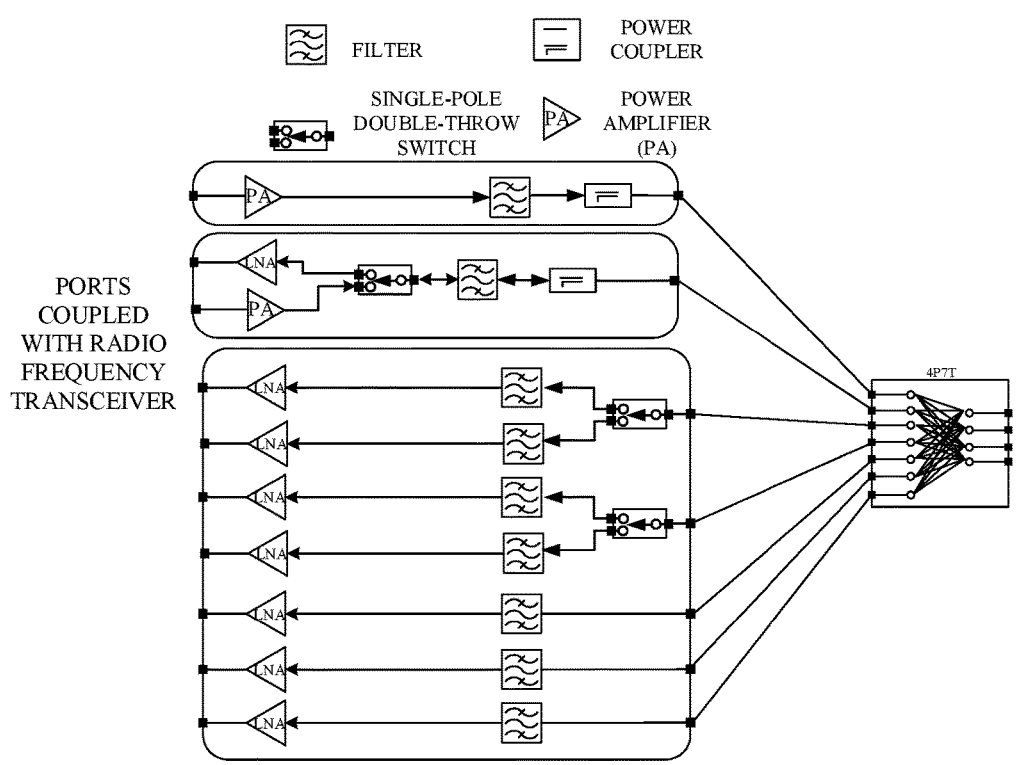
FIG. 6A is a schematic structural diagram illustrating a radio frequency circuit adapted to a fully coupled 4P7T switch of an electronic device operable in a dual-frequency single-transmit mode according to an implementation of the disclosure.

In the case that the electronic device is operable in the dual-frequency single-transmit mode, the radio frequency circuit of the electronic device logically includes eight receiver circuits and two transmitter circuits. Since each of the seven T ports of the multiway switch is fully coupled with the four P ports of the multiway switch, one of the two transmitter circuits can be coupled with a corresponding T port of the seven T ports of the multiway switch, and the other one of the two transmitter circuits and one of the eight receiver circuits are integrated into a transceiver circuit through a SPDT switch, to be coupled with another one T port of the seven T ports of the multiway switch. The remaining seven receiver circuits are divided into five groups: a first group and a second group each include two receiver circuits at different frequency bands, and the two receiver circuits are integrated into a receiver integrated circuit through a SPDT switch, to be coupled with one of the remaining five T ports of the multiway switch; a third group, a fourth group, and a fifth group each include one receiver circuit to be coupled with one of the remaining three T ports of the multiway switch, as illustrated in FIG. 6A. It should be noted that, the specific configuration of the radio frequency circuit adapted to the electronic device includes but is not limited to the configuration described in this implementation of the disclosure.

Figure 6B:
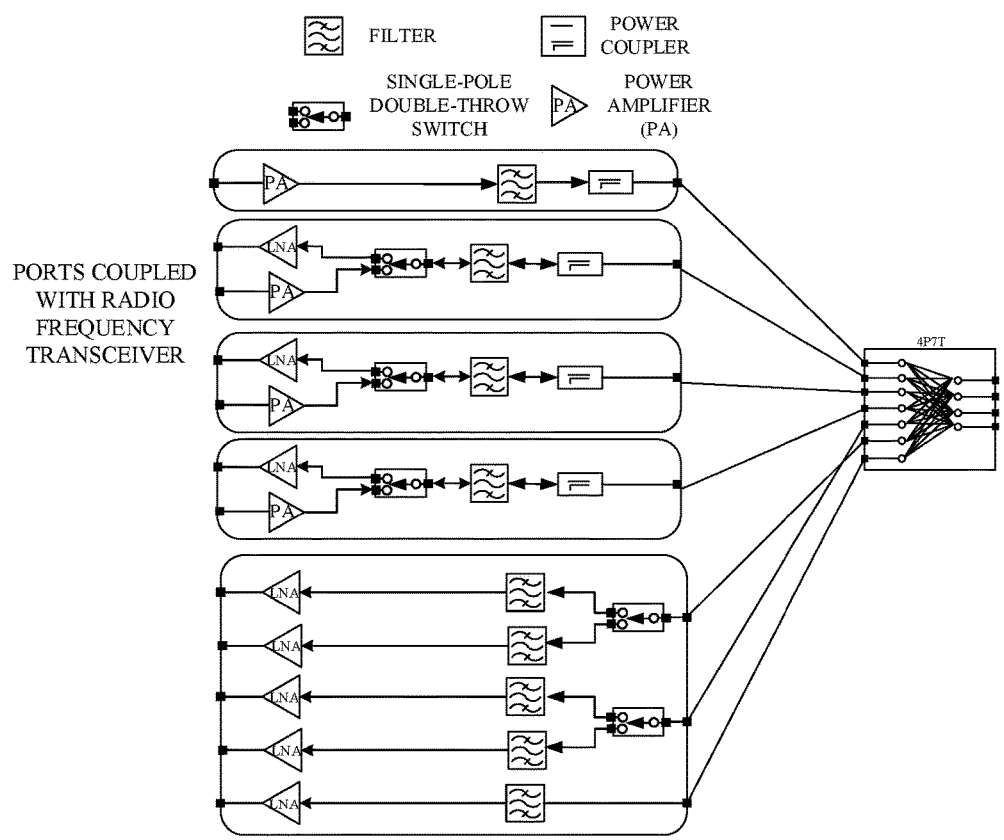
FIG. 6B is a schematic structural diagram illustrating a radio frequency circuit adapted to a fully coupled 4P7T switch of an electronic device operable in a dual-frequency dual-transmit mode according to an implementation of the disclosure.

In the case that the electronic device is operable in the dual-frequency dual-transmit mode, the radio frequency circuit of the electronic device logically includes eight receiver circuits and four transmitter circuits. Since each of the seven T ports of the multiway switch is fully coupled with the four P ports of the multiway switch, one of the four transmitter circuits can be coupled with a T port of the seven T ports of the multiway switch. The remaining three transmitter circuits can be respectively integrated with three of the eight receiver circuits into three transceiver circuits through three SPDT switches. The three transceiver circuits have ports coupled in one-to-one correspondence with three of the remaining six T ports. The remaining five receiver circuits are divided into three groups: a first group and a second group each include two receiver circuits at different frequency bands and the two receiver circuits are integrated into a receiver integrated circuit through a SPDT switch to be coupled with one of the remaining three T ports of the multiway switch, and a third group includes one receiver circuit to be coupled with the remaining one T port of the multiway switch, as illustrated in FIG. 6B. It should be noted that, the specific configuration of the radio frequency circuit adapted to the electronic device includes but is not limited to the configuration described in this implementation of the disclosure.

It can be understood that, for the transmit paths and the receive paths of the radio frequency system of the electronic device, the transmit paths can include one single independent switch (a 4P7T switch), or two independent switches (a SPDT switch and a 4P7T switch), and the receive paths can include one single independent switch (a 4P7T switch), or two independent switches (a SPDT switch and a 4P7T switch). That is to say, by integrating more switch functions of the transmit paths and the receive paths into the 4P7T switch, the number of independent switches in the transmit paths and the receive paths can be effectively reduced.

It can be concluded that for the case where n=7, the multiway switch of the implementation of the disclosure can enable the electronic device to be operable in the dual-frequency single-transmit mode or the dual-frequency dual-transmit mode. It is beneficial to simplifying the RF architecture of the electronic device supporting four-port SRS switching in the 5G NR, reducing the number of switches in the transmit paths and receive paths and reducing path loss, thereby improving transmit power/sensitivity, data transmission rate in the 5G NR, and uplink and downlink coverage of the mobile phone, and reducing power consumption.

In one possible implementation, n=8 (that is, the multiway switch includes eight T ports). The electronic device is operable in at least one of: the dual-frequency single-transmit mode and the dual-frequency dual-transmit mode.

The number of MOS transistors corresponding to the multiway switch is 8+8*4*3+4=108.

Figure 7A:
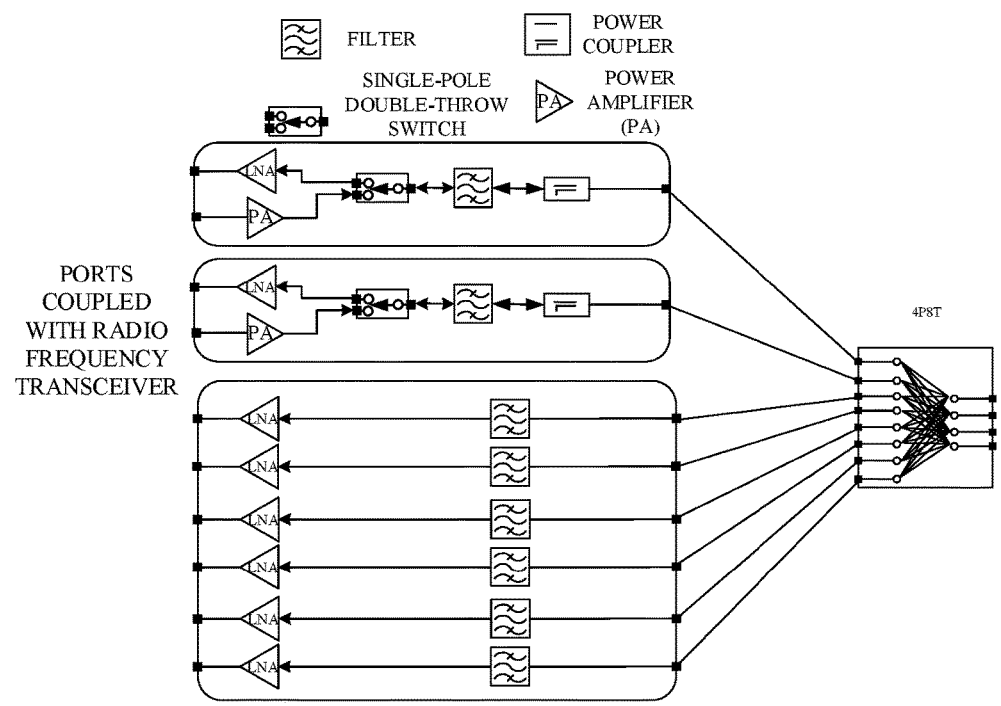
FIG. 7A is a schematic structural diagram illustrating a radio frequency circuit adapted to a fully coupled 4P8T switch of an electronic device operable in a dual-frequency single-transmit mode according to an implementation of the disclosure.

In the case that the electronic device is operable in the dual-frequency single-transmit mode, the radio frequency circuit of the electronic device logically includes eight receiver circuits and two transmitter circuits. Since each of the eight T ports of the multiway switch is fully coupled with the four P ports of the multiway switch, each of the two transmitter circuits can be integrated in one-to-one correspondence with one of the eight receiver circuits into a transceiver circuit and the transceiver circuit is coupled with one of the eight T ports of the multiway switch. The remaining six receiver circuits are coupled with the remaining six T ports of the multiway switch (in one-to-one correspondence), as illustrated in FIG. 7A. It should be noted that, the specific configuration of the radio frequency circuit adapted to the electronic device includes but is not limited to the configuration described in this implementation of the disclosure.

Figure 7B:
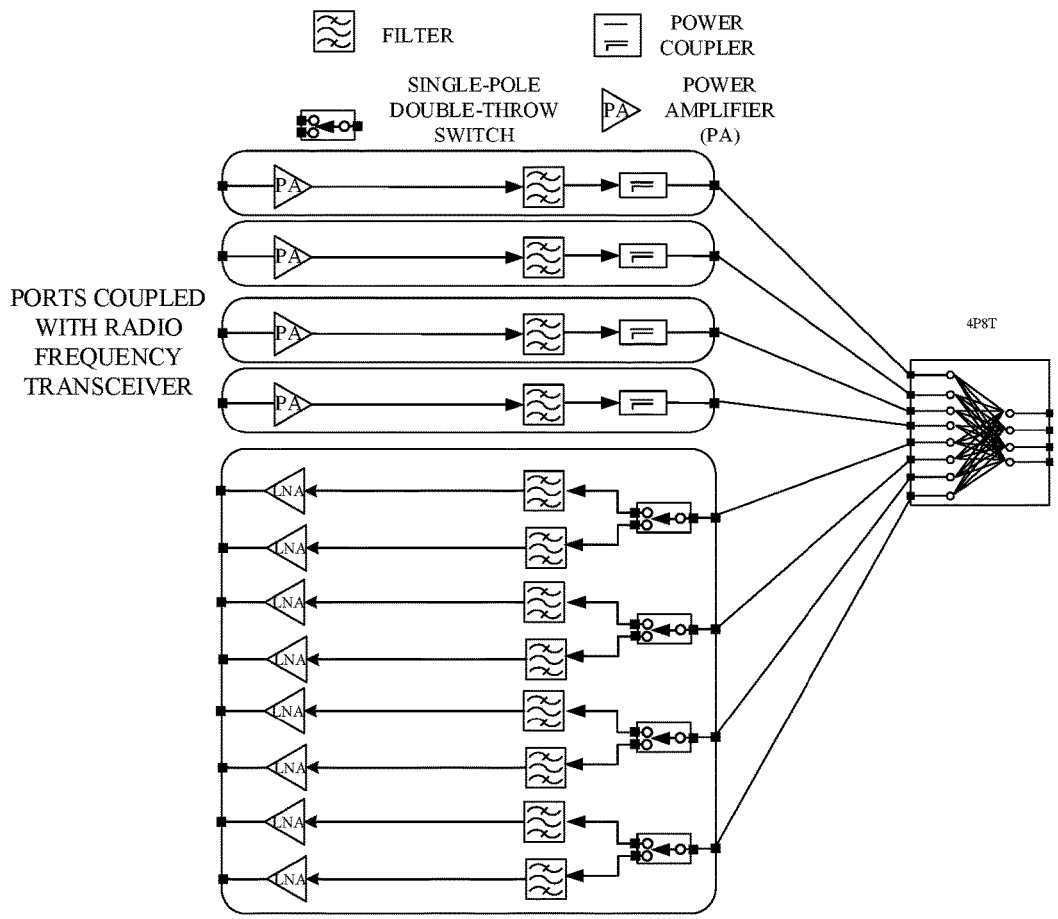
FIG. 7B is a schematic structural diagram illustrating a radio frequency circuit adapted to a fully coupled 4P8T switch of an electronic device operable in a dual-frequency dual-transmit mode according to an implementation of the disclosure.

In the case that the electronic device is operable in the dual-frequency dual-transmit mode, the radio frequency circuit of the electronic device logically includes eight receiver circuits and four transmitter circuits. Since each of the eight T ports of the multiway switch is fully coupled with the four P ports of the multiway switch, each of the four transmitter circuits is coupled with one of the eight T ports of the multiway switch (in one-to-one correspondence). The eight receiver circuits are divided into four groups, and each group includes two receiver circuits at different frequency bands. The two receiver circuits are integrated into a receiver integrated circuit through a SPDT switch, and the receiver integrated circuit is coupled with one of the remaining four T ports of the multiway switch, as illustrated in FIG. 7B. It should be noted that, the specific configuration of the radio frequency circuit adapted to the electronic device includes but is not limited to the configuration described in this implementation of the disclosure.

It can be understood that, for the transmit paths and the receive paths of the radio frequency system of the electronic device, the transmit paths can include one single independent switch (a 4P8T switch), or two independent switches (a SPDT switch and a 4P8T switch), and the receive paths can include one single independent switch (a 4P8T switch), or two independent switches (a SPDT switch and a 4P8T switch). That is to say, by integrating more switch functions of the transmit paths and the receive paths into the 4P8T switch, the number of independent switches in the transmit paths and the receive paths can be effectively reduced.

It can be concluded that for the case where n=8, the multiway switch of the implementation of the disclosure can enable the electronic device to be operable in the dual-frequency single-transmit mode or the dual-frequency dual-transmit mode. It is beneficial to simplifying the RF architecture of the electronic device supporting four-port SRS switching in the 5G NR, reducing the number of switches in the transmit paths and the receive paths and reducing path loss, thereby improving transmit power/sensitivity, data transmission rate in the 5G NR, and uplink and downlink coverage of the mobile phone, and reducing power consumption.

In one possible implementation, n=9 (that is, the multiway switch includes nine T ports). The electronic device is operable in at least one of: the dual-frequency single-transmit mode and the dual-frequency dual-transmit mode.

The number of MOS transistors corresponding to the multiway switch is 9+9*4*3+4=121.

Figure 8A:
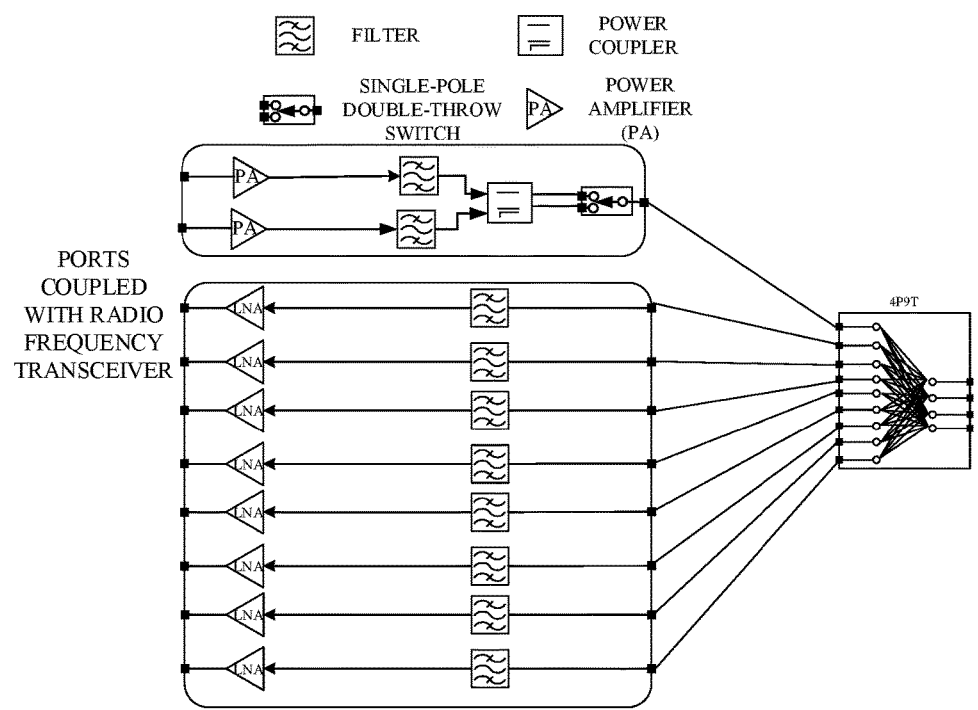
FIG. 8A is a schematic structural diagram illustrating a radio frequency circuit adapted to a fully coupled 4P9T switch of an electronic device operable in a dual-frequency single-transmit mode according to an implementation of the disclosure.

In the case that the electronic device is operable in the dual-frequency single-transmit mode, the radio frequency circuit of the electronic device logically includes eight receiver circuits and two transmitter circuits. Since each of the nine T ports of the multiway switch is fully coupled with the four P ports of the multiway switch, the two transmitter circuits can be integrated into a transmitter integrated circuit through a SPDT switch, and the transmitter integrated circuit is coupled with one of the nine T ports of the multiway switch. The eight receiver circuits are coupled with the remaining eight T ports of the multiway switch (in one-to-one correspondence), as illustrated in FIG. 8A. It should be noted that, the specific configuration of the radio frequency circuit adapted to the electronic device includes but is not limited to the configuration described in this implementation of the disclosure.

Figure 8B:
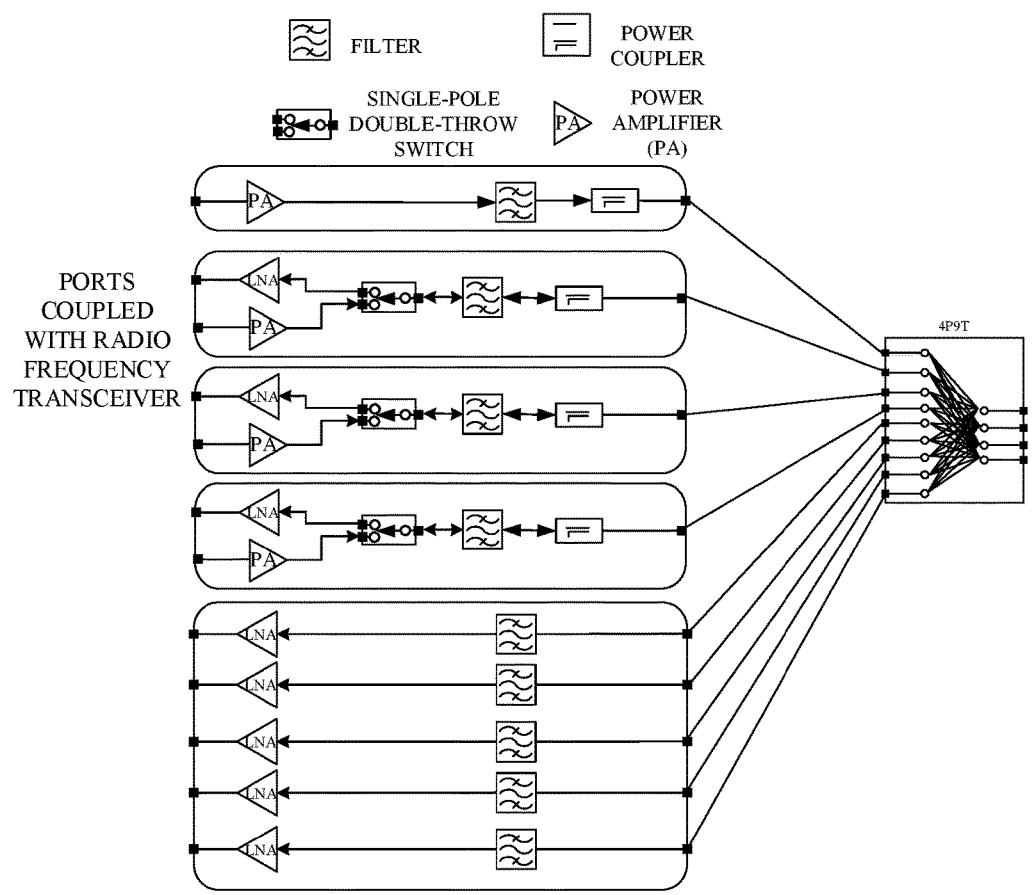
FIG. 8B is a schematic structural diagram illustrating a radio frequency circuit adapted to a fully coupled 4P9T switch of an electronic device operable in a dual-frequency dual-transmit mode according to an implementation of the disclosure.

In the case that the electronic device is operable in the dual-frequency dual-transmit mode, the radio frequency circuit of the electronic device logically includes eight receiver circuits and four transmitter circuits. Since each of the nine T ports of the multiway switch is fully coupled with the four P ports of the multiway switch, one of the four transmitter circuits can be coupled with one of the nine T ports of the multiway switch. Each of the remaining three transmitter circuits is integrated with a corresponding reception processing circuit of the eight receiver circuits at the same frequency band into a transceiver circuit through a SPDT switch, and the transceiver circuit is coupled with one of the remaining eight T ports of the multiway switch. The remaining five receiver circuits are coupled with the remaining five T ports of the multiway switch (in one-to-one correspondence), as illustrated in FIG. 8B. It should be noted that, the specific configuration of the radio frequency circuit adapted to the electronic device includes but is not limited to the configuration described in this implementation of the disclosure.

It can be understood that, for the transmit paths and the receive paths of the radio frequency system of the electronic device, the transmit paths can include one single independent switch (a 4P9T switch), or two independent switches (a SPDT switch and a 4P9T switch), and the receive paths can include one single independent switch (a 4P9T switch), or two independent switches (a SPDT switch and a 4P9T switch). That is to say, by integrating more switch functions of the transmit paths and the receive paths into the 4P9T switch, the number of independent switches in the transmit paths and the receive paths can be effectively reduced.

It can be concluded that for the case where n=9, the multiway switch of the implementation of the disclosure can enable the electronic device to be operable in the dual-frequency single-transmit mode or the dual-frequency dual-transmit mode. It is beneficial to simplifying the RF architecture of the electronic device supporting four-port SRS switching in the 5G NR, reducing the number of switches in transmit paths and receive paths and reducing path loss, thereby improving transmit power/sensitivity, data transmission rate in the 5G NR, and uplink and downlink coverage of the mobile phone, and reducing power consumption.

In one possible implementation, n=10 (that is, the multiway switch includes ten T ports). The electronic device is operable in at least one of: the dual-frequency single-transmit mode and the dual-frequency dual-transmit mode.

The number of MOS transistors corresponding to the multiway switch is 10+10*4*3+4=134.

Figure 9A:
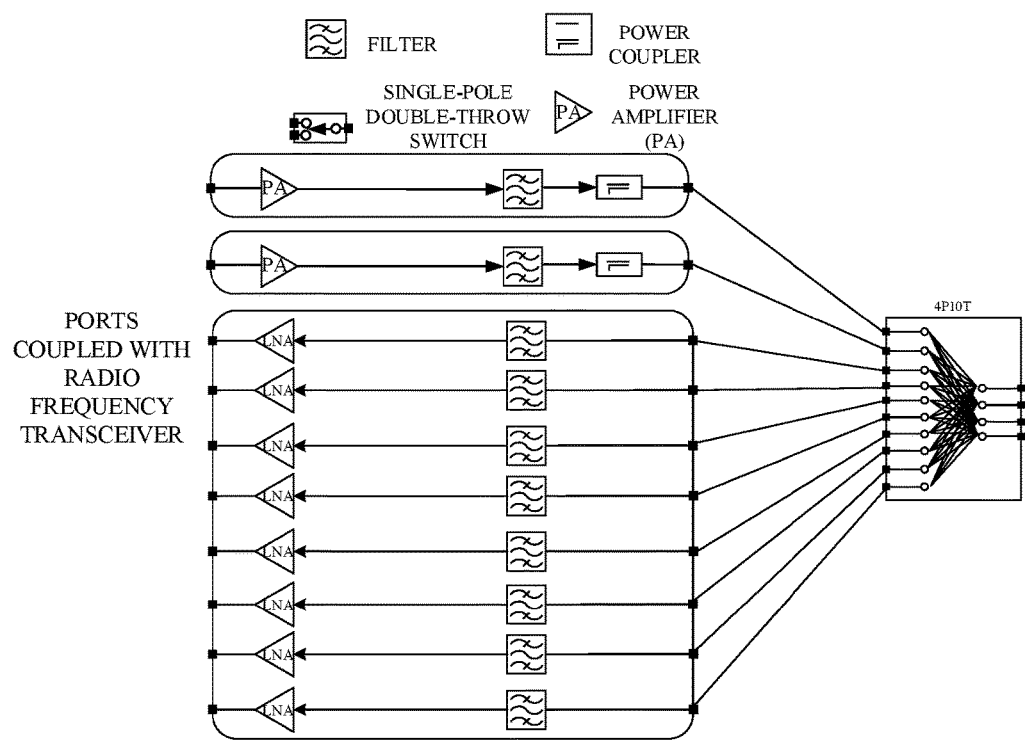
FIG. 9A is a schematic structural diagram illustrating a radio frequency circuit adapted to a fully coupled 4P10T switch of an electronic device operable in a dual-frequency single-transmit mode according to an implementation of the disclosure.

In the case that the electronic device is operable in the dual-frequency single-transmit mode, the radio frequency circuit of the electronic device logically includes eight receiver circuits and two transmitter circuits. Since each of the ten T ports of the multiway switch is fully coupled with the four P ports of the multiway switch, each of the two transmitter circuits is coupled with one of the ten T ports of the multiway switch (in one-to-one correspondence), and each of the eight receiver circuits is coupled with one of the remaining eight T ports of the multiway switch (in one-to-one correspondence), as illustrated in FIG. 9A. It should be noted that, the specific configuration of the radio frequency circuit adapted to the electronic device includes but is not limited to the configuration described in this implementation of the disclosure.

Figure 9B:
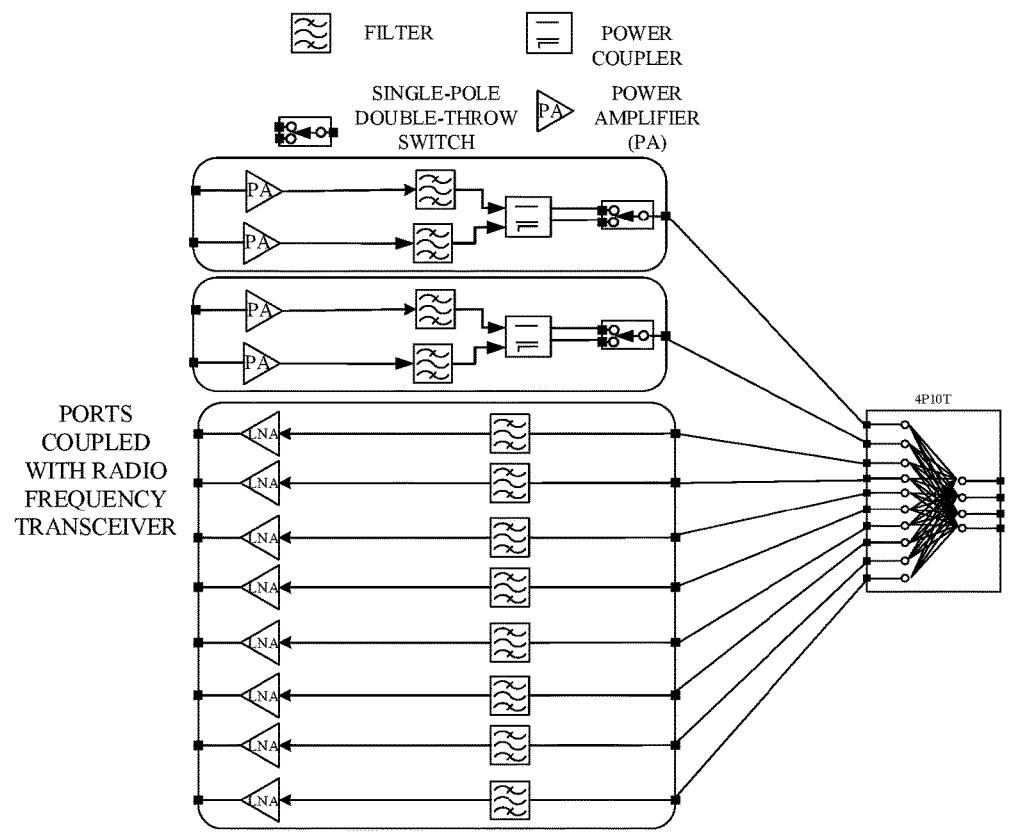
FIG. 9B is a schematic structural diagram illustrating a radio frequency circuit adapted to a fully coupled 4P10T switch of an electronic device operable in a dual-frequency dual-transmit mode according to an implementation of the disclosure.

In the case that the electronic device is operable in the dual-frequency dual-transmit mode, the radio frequency circuit of the electronic device logically includes eight receiver circuits and four transmitter circuits. Since each of the ten T ports of the multiway switch is fully coupled with the four P ports of the multiway switch, the four transmitter circuits can be divided into two groups. Each group includes two transmitter circuits at different frequency bands. The two transmitter circuits at different frequency bands are integrated into a transmitter integrated circuit through a SPDT switch and the transmitter integrated circuit is coupled with one of the ten T ports of the multiway switch. Each of the eight receiver circuits is coupled with one of the remaining eight T ports of the multiway switch (in one-to-one correspondence), as illustrated in FIG. 9B. It should be noted that, the specific configuration of the radio frequency circuit adapted to the electronic device includes but is not limited to the configuration described in this implementation of the disclosure.

It can be understood that, for the transmit paths and the receive paths of the radio frequency system of the electronic device, the transmit paths can include one single independent switch (a 4P10T switch), or two independent switches (a SPDT switch and a 4P10T switch), and the receive paths can include one single independent switch (a 4P10T switch), or two independent switches (a SPDT switch and a 4P10T switch). That is to say, by integrating more switch functions of the transmit paths and the receive paths into 4P10T switches, the number of independent switches in the transmit paths and the receive paths can be effectively reduced.

It can be concluded that for the case where n=10, the multiway switch of the implementation of the disclosure can enable the electronic device to be operable in the dual-frequency single-transmit mode or the dual-frequency dual-transmit mode. It is beneficial to simplifying the RF architecture of the electronic device supporting four-port SRS switching in the 5G NR, reducing the number of switches in transmit paths and receive paths and reducing path loss, thereby improving transmit power/sensitivity, data transmission rate in the 5G NR, and uplink and downlink coverage of the mobile phone, and reducing power consumption.

In one possible implementation, n=11 (that is, the multiway switch includes eleven T ports). The electronic device is operable in the dual-frequency dual-transmit mode.

The number of MOS transistors corresponding to the multiway switch is 11+11*4*3+4=147.

Figure 10:
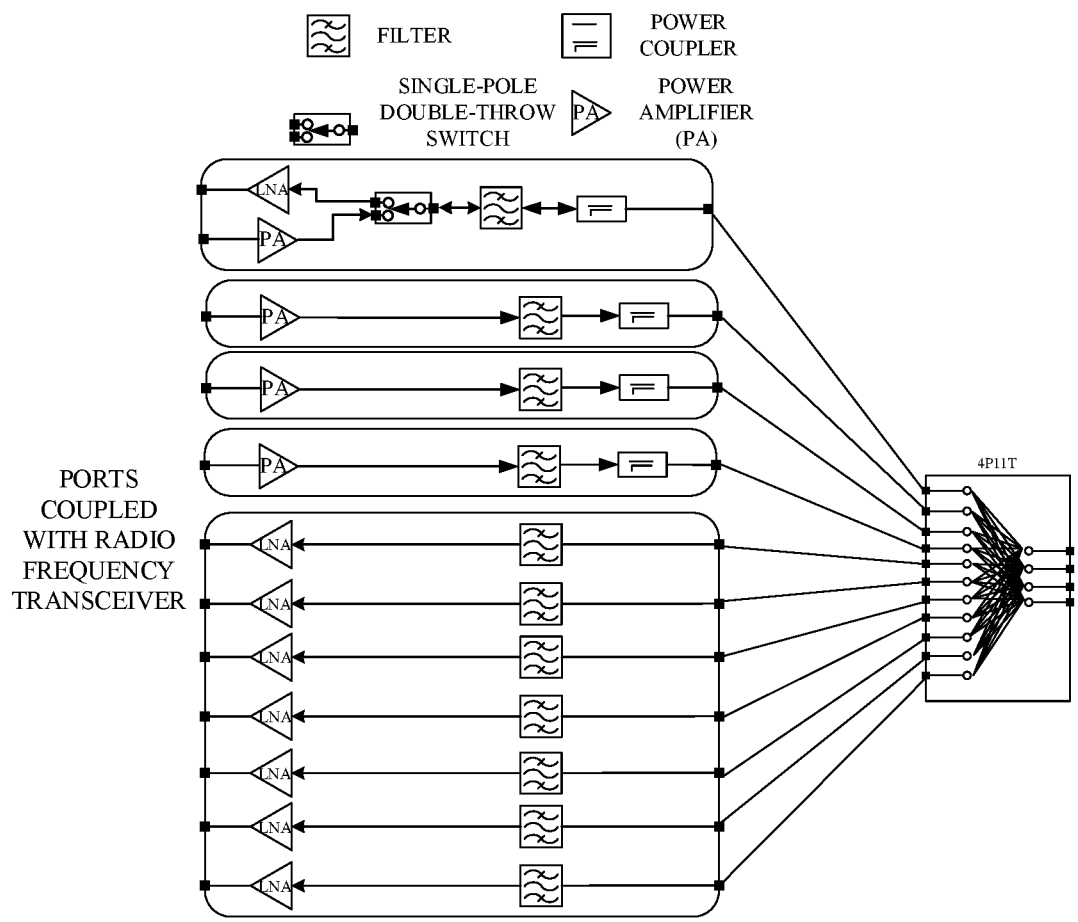
FIG. 10 is a schematic structural diagram illustrating a radio frequency circuit adapted to a fully coupled 4P11T switch of an electronic device operable in a dual-frequency dual-transmit mode according to an implementation of the disclosure.

In the case that the electronic device is operable in the dual-frequency dual-transmit mode, the radio frequency circuit of the electronic device logically includes eight receiver circuits and four transmitter circuits. Since each of the eleven T ports of the multiway switch is fully coupled with the four P ports of the multiway switch, one of the four transmitter circuits and one of the eight receiver circuits can be integrated into a transceiver circuit through a SPDT switch. The transceiver circuit is coupled with one of the eleven T ports of the multiway switch. Each of the remaining three transmitter circuits is coupled with one of the remaining ten T ports of the multiway switch (in one-to-one correspondence). The remaining seven receiver circuits are respectively coupled in one-to-one correspondence with the remaining seven T ports of the multiway switch, as illustrated in FIG. 10. It should be noted that, the specific configuration of the radio frequency circuit adapted to the electronic device includes but is not limited to the configuration described in this implementation of the disclosure.

It can be understood that, for the transmit paths and the receive paths of the radio frequency system of the electronic device, the transmit paths can include one single independent switch (a 4P11T switch), or two independent switches (a SPDT switch and a 4P11T switch), and the receive paths can include one single independent switch (a 4P11T switch), or two independent switches (a SPDT switch and a 4P11T switch). That is to say, by integrating more switch functions of the transmit paths and the receive paths into the 4P11T switch, the number of independent switches in the transmit paths and the receive paths can be effectively reduced.

It can be concluded that for the case where n=11, the multiway switch of the implementation of the disclosure can enable the electronic device to be operable in the dual-frequency dual-transmit mode. It is beneficial to simplifying the RF architecture of the electronic device supporting four-port SRS switching in the 5G NR, reducing the number of switches in transmit paths and receive paths and reducing path loss, thereby improving transmit power/sensitivity, data transmission rate in the 5G NR, and uplink and downlink coverage of the mobile phone, and reducing power consumption.

In one possible implementation, n=12 (that is, the multiway switch includes twelve T ports). The electronic device is operable in the dual-frequency dual-transmit mode.

The number of MOS transistors corresponding to the multiway switch is 12+12*4*3+4=160.

Figure 11:
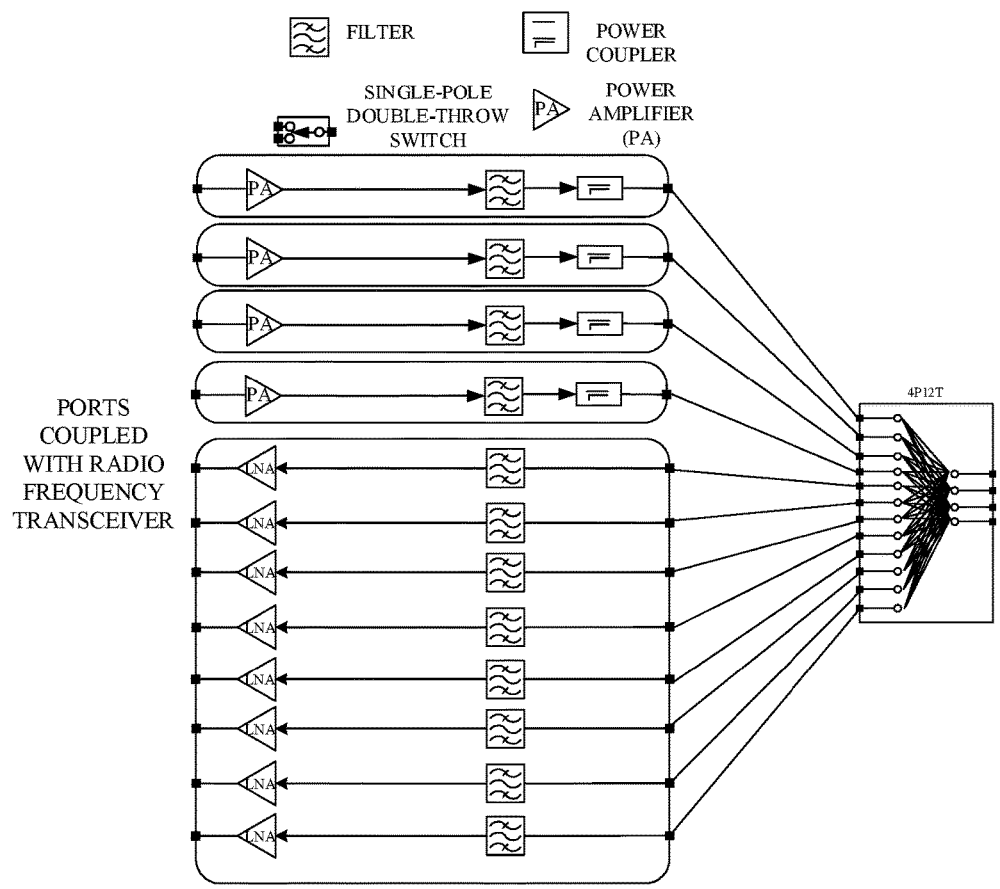
FIG. 11 is a schematic structural diagram illustrating a radio frequency circuit adapted to a fully coupled 4P12T switch of an electronic device operable in a dual-frequency dual-transmit mode according to an implementation of the disclosure.

In the case that the electronic device is operable in the dual-frequency dual-transmit mode, the radio frequency circuit of the electronic device logically includes eight receiver circuits and four transmitter circuits. Since each of the twelve T ports of the multiway switch is fully coupled with the four P ports of the multiway switch, the four transmitter circuits and the eight receiver circuits can be coupled in one-to-one correspondence with the twelve T ports of the multiway switch, as illustrated in FIG. 11. It should be noted that, the specific configuration of the radio frequency circuit adapted to the electronic device includes but is not limited to the configuration described in this implementation of the disclosure.

It can be understood that, for the transmit paths and the receive paths of the radio frequency system of the electronic device, the transmit paths can include one single independent switch (a 4P12T switch), or two independent switches (a SPDT switch and a 4P12T switch), and the receive paths can include one single independent switch (a 4P12T switch), or two independent switches (a SPDT switch and a 4P12T switch). That is to say, by integrating more switch functions of the transmit paths and the receive paths into the 4P12T switch, the number of independent switches in the transmit paths and receive paths can be effectively reduced.

It can be concluded that for the case where n=12, the multiway switch of the implementation of the disclosure can enable the electronic device to be operable in the dual-frequency dual-transmit mode. It is beneficial to simplifying the RF architecture of the electronic device supporting four-port SRS switching in the 5G NR, reducing the number of switches in transmit paths and receive paths and reducing path loss, thereby improving transmit power/sensitivity, data transmission rate in the 5G NR, and uplink and downlink coverage of the mobile phone, and reducing power consumption.

It can be understood that, the above-mentioned receiver circuits and transmitter circuits can be implemented in various manners. The implementations of the disclosure are not particularly restricted.

In one possible implementation, the electronic device is operable in the single-frequency single-transmit mode and the radio frequency circuit logically includes one transmitter circuit and four receiver circuits. The radio frequency circuit physically includes at least one independent circuit module. The at least one independent circuit module has receive ports (also known as signal receive ports) and at least one of a transmit-receive port (also known as a signal transmit-receive port) and a transmit port (also known as a signal transmit port), which are configured to be coupled with the T ports. Specifically, the at least one independent circuit module can have one or more transmit-receive ports, one or more transmit ports, or one or more transmit-receive ports and one or more transmit ports.

The transmit-receive port of the independent circuit module corresponds to a port at which the transmitter circuit and the receiver circuit are integrated.

It can be understood that, in this implementation, the radio frequency circuit can be embodied in a variety of physical forms, which are not limited herein.

In this implementation, for the electronic device operable in the single-frequency single-transmit mode, the radio frequency circuit adapted to the multiway switch physically includes at least one independent circuit module, which is beneficial to improving flexibility of adaptation and reducing the cost.

In one possible implementation, the electronic device is operable in the single-frequency dual-transmit mode and the radio frequency circuit logically includes two transmitter circuits and four receiver circuits. The radio frequency circuit physically includes at least two independent circuit modules. The at least two independent circuit modules have receive ports and at least one of a transmit-receive port and a transmit port, which are configured to be coupled with the T ports.

Since low-noise amplifiers (LNA) in the receiver circuits can operate simultaneously, due to their low power and low power consumption, mutual influence can be avoided through design. Therefore, multiple LNAs in multiple receiver circuits at the same frequency band can be disposed in the same circuit module.

As can be seen, in this example, when two PAs at the same frequency band work simultaneously (corresponding to UL MIMO mode), a transmit power will be high, and two signals will interfere with each other. In addition, the two PAs will affect heat dissipation efficiency when working at the same time. Considering this, two independent circuit modules are needed to set PAs in the transmitter circuits, which is beneficial to reducing interference and improving signal processing efficiency and heat dissipation efficiency of the radio frequency system.

In one possible implementation, the electronic device is operable in the dual-frequency single-transmit mode and the radio frequency circuit logically includes two transmitter circuits and eight receiver circuits. The radio frequency circuit physically includes at least one independent circuit module. The at least one independent circuit module has receive ports and at least one of a transmit-receive port and a transmit port, which are configured to be coupled with the T ports.

Since PAs in the transmitter circuits at different frequency bands do not work at the same time, two PAs at different frequency bands can be provided in the same independent circuit module.

In this implementation, for the electronic device operable in the dual-frequency single-transmit mode, the radio frequency circuit adapted to the multiway switch physically includes at least one independent circuit module, which is beneficial to improving flexibility of adaptation and reducing the cost.

In one possible implementation, the electronic device is operable in the dual-frequency dual-transmit mode and the radio frequency circuit logically includes four transmitter circuits and eight receiver circuits. The radio frequency circuit physically includes at least two independent circuit modules. When there is an independent circuit module including two power amplifiers (PA) of the at least two independent circuit modules, the two PAs of the independent circuit module work at different frequency bands. The at least two independent circuit modules have receive ports and at least one of a transmit-receive port and a transmit port, which are configured to be coupled with the T ports.

As can be seen, in this example, since two PAs at the same frequency band can work simultaneously (corresponding to UL MIMO mode), a transmit power will be high, and two signals will interfere with each other. In addition, the two PAs will affect heat dissipation efficiency when working at the same time. Therefore, two independent circuit modules are needed to set PAs in the transmitter circuits. At the same time, since PAs at different frequency bands in the transmitter circuits do not work at the same time, two PAs at different frequency bands can be provided in the same independent circuit module. It is beneficial to reducing interference and improving signal processing efficiency and heat dissipation efficiency of the radio frequency system.

In one possible implementation, the four antennas include a first antenna, a second antenna, a third antenna, and a fourth antenna. These four antennas are all operable at a fifth generation new radio (5G NR) frequency band. The 5G NR frequency band may include, for example, 3.3 GHz to 5 GHz.

In one possible implementation, the four antennas include a first antenna, a second antenna, a third antenna, and a fourth antenna. The first antenna and the fourth antenna are antennas operable at a long term evolution (LTE) frequency band and a 5G NR frequency band. The second antenna and the third antenna are antennas only operable at the 5G NR frequency band.

The first antenna and fourth antenna are intended to support DL 4×4 MIMO for some frequency bands in LTE on terminals. These two antennas are shared with the 5G NR (hereinafter, "shared antennas" for short). The LTE frequency band may include, for example, 1710-2690 MHz.

Figure 12:
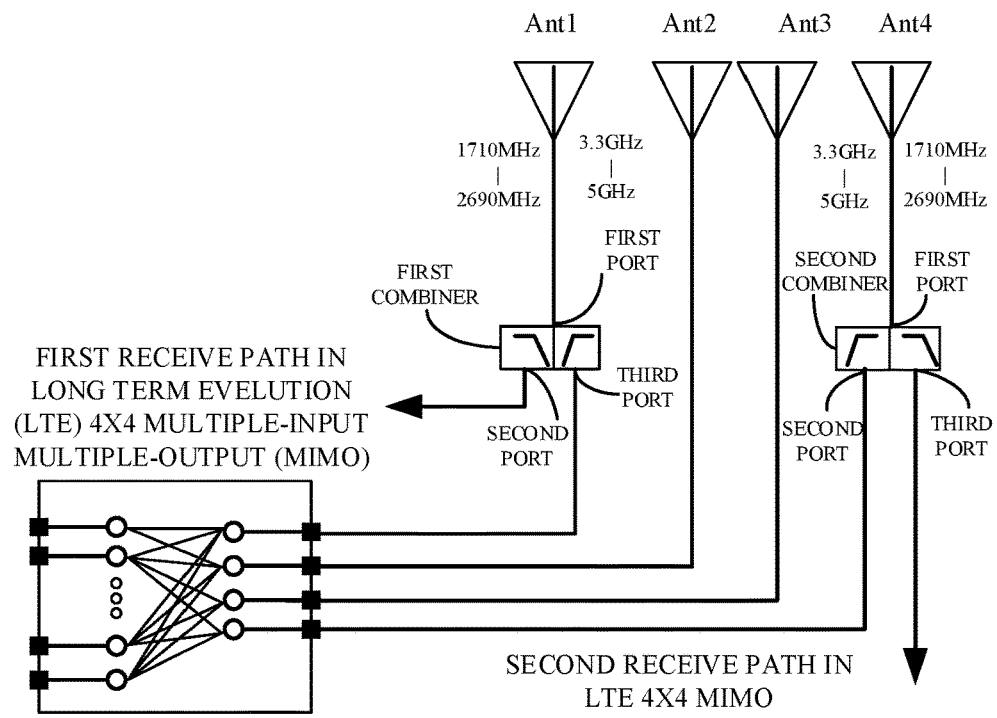
FIG. 12 is a schematic structural diagram illustrating an antenna system of an electronic device according to an implementation of the disclosure.

In one possible implementation, as illustrated in FIG. 12, the antenna system further includes a first combiner and a second combiner. The first combiner has a first port configured to be coupled with the first antenna, a second port configured to be coupled with a first receive path in LTE 4×4 multiple-input multiple-output (MIMO) configuration of the electronic device, and a third port configured to be coupled with a corresponding P port of the multiway switch. The second combiner has a first port configured to be coupled with the fourth antenna, a second port configured to be coupled with a second receive path in the LTE 4×4 MIMO configuration of the electronic device, and a third port configured to be coupled with a corresponding P port of the multiway switch.

The LTE 4*4 MIMO is a downlink LTE receive circuit and can be defined as a third receive path. Since the LTE currently has two receive paths, in order to support LTE 4×4 MIMO, the third path and a fourth receive path are added.

According to performance of the four antennas, the electronic device will arrange one antenna with better performance for the circuit for PRX (primary receiver), and the antenna will be in a standby state. Moreover, T ports of the switch having both the transmission function and the reception function can be configured for TX (transmit) and PRX purpose, and thus the antenna can be switched arbitrarily. In this way, there is no need to restrict the coupling between ports of shared antennas.

Figure 13:
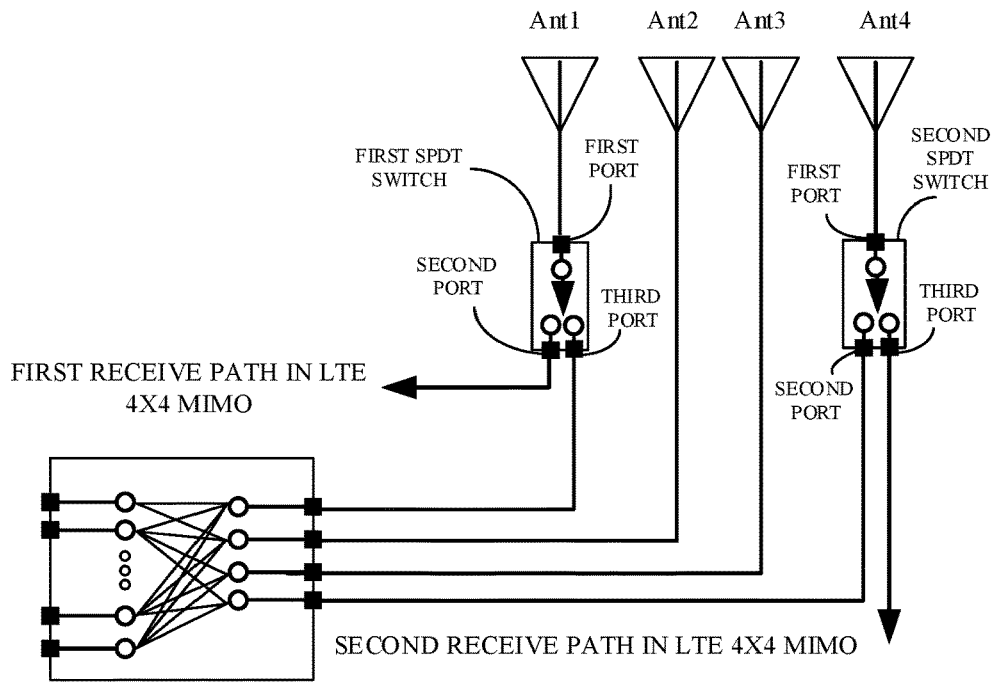
FIG. 13 is a schematic structural diagram illustrating an antenna system of an electronic device according to an implementation of the disclosure.

In one possible implementation, as illustrated in FIG. 13, the antenna system further includes a first single-pole double-throw (SPDT) switch and a second SPDT switch. The first SPDT switch has a first port configured to be coupled with the first antenna, a second port configured to be coupled with a first receive path in LTE 4×4 multiple-input multiple-output (MIMO) configuration of the electronic device, and a third port configured to be coupled with a corresponding P port of the multiway switch. The second SPDT switch has a first port configured to be coupled with the fourth antenna, a second port configured to be coupled with a second receive path in the LTE 4×4 MIMO configuration of the electronic device, and a third port configured to be coupled with a corresponding P port of the multiway switch.

The schemes of the disclosure can be combined or replaced with each other. For example, the antenna system and/or the multiway switch described above can be applied or combined into the radio frequency system and the wireless communication device below. It is to be noted that, "the antenna system and/or the multiway switch" of the disclosure means "the antenna system", "the multiway switch", or "the antenna system and the multiway switch".

Figure 14:
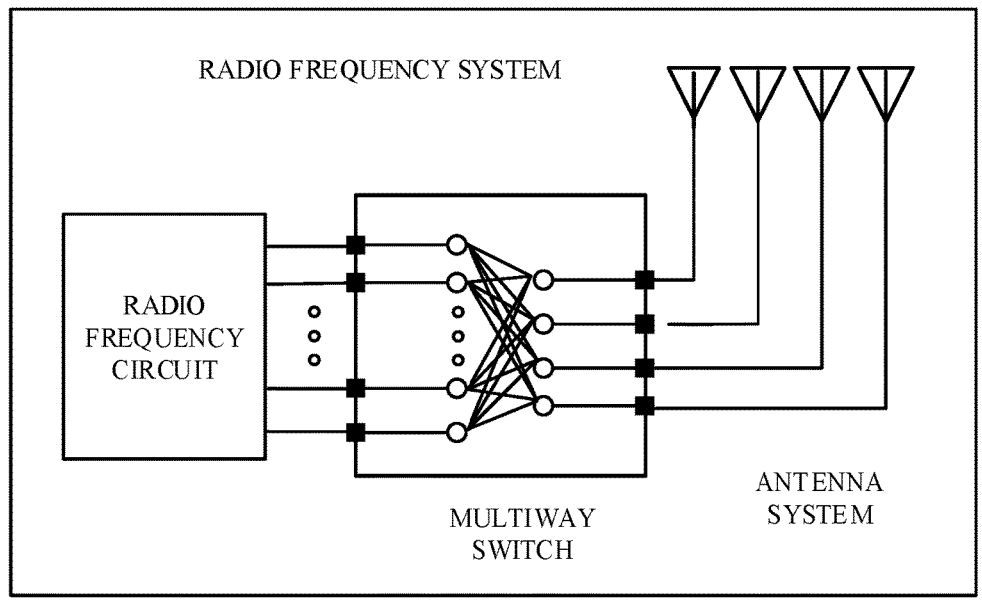
FIG. 14 is a schematic structural diagram illustrating a radio frequency system according to an implementation of the disclosure.

FIG. 14 is a schematic structural diagram illustrating a radio frequency system according to an implementation of the disclosure. The radio frequency system includes an antenna system, a radio frequency circuit, and the multiway switch according to any of the implementations above. The multiway switch includes n T ports and four P ports. Each T port is coupled with all of the four P ports, where n is an integer and 4≤n. The antenna system includes four antennas corresponding to the four P ports.

The multiway switch is coupled with the radio frequency circuit and the antenna system and is configured to implement a preset function of the radio frequency system, and the preset function is a function of transmitting an SRS through the four antennas corresponding to the four P ports in turn. The 4PnT configuration of the multiway switch can refer to the foregoing descriptions and will not be detailed again herein.

As one implementation, 4≤n≤12. Each P port is coupled with one antenna of the four antennas. Any two P ports of the four P ports are coupled with different antennas of the four antennas.

As one implementation, the four antennas include a first antenna, a second antenna, a third antenna, and a fourth antenna. The first antenna and the fourth antenna are antennas operable at a long term evolution (LTE) frequency band and a fifth generation new radio (5G NR) frequency band. The second antenna and the third antenna are antennas only operable at the 5G NR frequency band.

As one implementation, with the above structure regarding to the four antennas, the antenna system further includes a first combiner and a second combiner. The first combiner has a first port coupled with the first antenna, a second port coupled with a first receive path in LTE 4×4 multiple-input multiple-output (MIMO) configuration of the electronic device, and a third port coupled with a corresponding P port of the multiway switch. The second combiner has a first port coupled with the fourth antenna, a second port coupled with a second receive path in the LTE 4×4 MIMO configuration of the electronic device, and a third port coupled with a corresponding P port of the multiway switch.

As one implementation, with the above structure regarding to the four antennas, the antenna system further includes a first single-pole double-throw (SPDT) switch and a second SPDT switch. The first SPDT switch has a first port coupled with the first antenna, a second port coupled with a first receive path in LTE 4×4 MIMO configuration of the electronic device, and a third port coupled with a corresponding P port of the multiway switch. The second SPDT switch has a first port coupled with the fourth antenna, a second port coupled with a second receive path in the LTE 4×4 MIMO configuration of the electronic device, and a third port coupled with a corresponding P port of the multiway switch.

The definitions related to the radio frequency system illustrated in FIG. 14 are similar to the foregoing descriptions and are not described herein.

Figure 15:
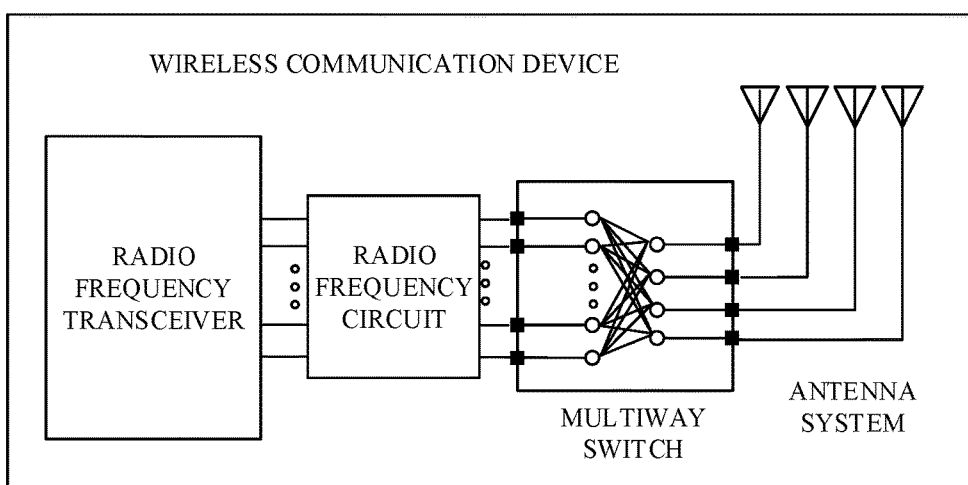
FIG. 15 is a schematic structural diagram illustrating a wireless communication device according to an implementation of the disclosure.

FIG. 15 is a schematic structural diagram illustrating a wireless communication device according to an implementation of the disclosure. The wireless communication device can be an electronic device, a base station, and the like, and includes an antenna system, a radio frequency transceiver, a radio frequency circuit coupled with the radio frequency transceiver, and the multiway switch described in any of the implementations above.

The multiway switch includes n T ports and four P ports. Each T port is coupled with all of the four P ports, where n is an integer and 4≤n≤12. Each P port is coupled with one antenna of the four antennas. Any two P ports of the four P ports are coupled with different antennas of the four antennas. The antenna system includes four antennas corresponding to the four P ports.

The multiway switch is coupled with the radio frequency circuit and the antenna system and supports a function of transmitting an SRS through the four antennas in turn.

Figure 16:
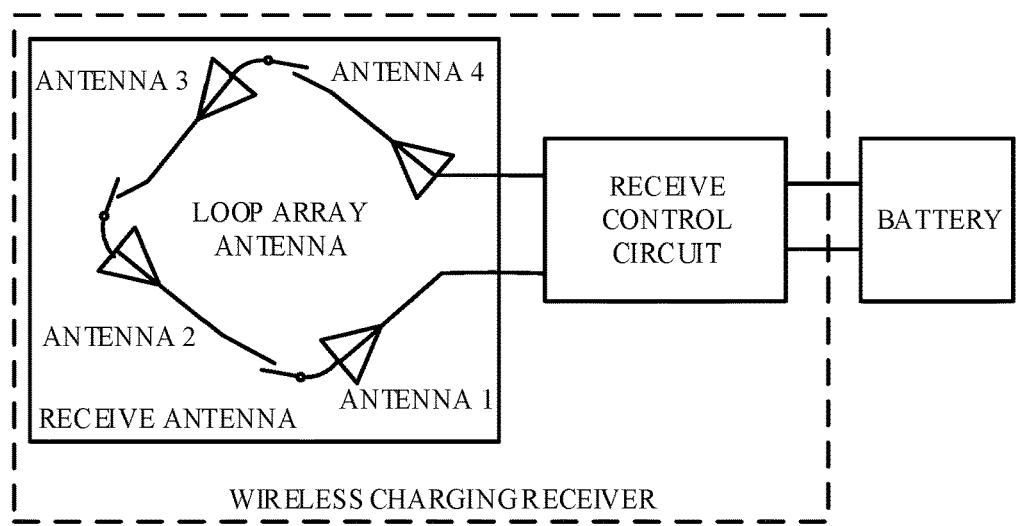
FIG. 16 is a schematic diagram illustrating a wireless charging receiver for multiplexing an antenna of a wireless communication device according to an implementation of the disclosure.

In addition, as illustrated in FIG. 16, the four antennas in the antenna system described in the implementations of the disclosure can also be multiplexed by a wireless charging receiver of the electronic device. The wireless charging receiver includes a receive antenna and a receive control circuit. The receive antenna matches transmit antennas of a wireless charging transmitter (resonates at the same or similar frequency and transfers energy in a wireless manner in the way of radiative resonant magnetic coupling). The receive control circuit converts, through a loop array antenna, the energy into a direct current (DC) to output to charge a battery. The receive control circuit can dynamically adjust a frequency of the loop array antenna and match the frequency of the loop array antenna with frequencies of the transmit antennas of the wireless charging transmitter to achieve paired charging. Alternatively, the receive control circuit interacts with the wireless charging transmitter in real time on a frequency change range to implement an "exclusive encryption" wireless charging mode.

The receive antenna may be an antenna include at least one of the four antennas (in the case of multiple antennas, the multiple antennas are strobed via switches).

Figure 17:
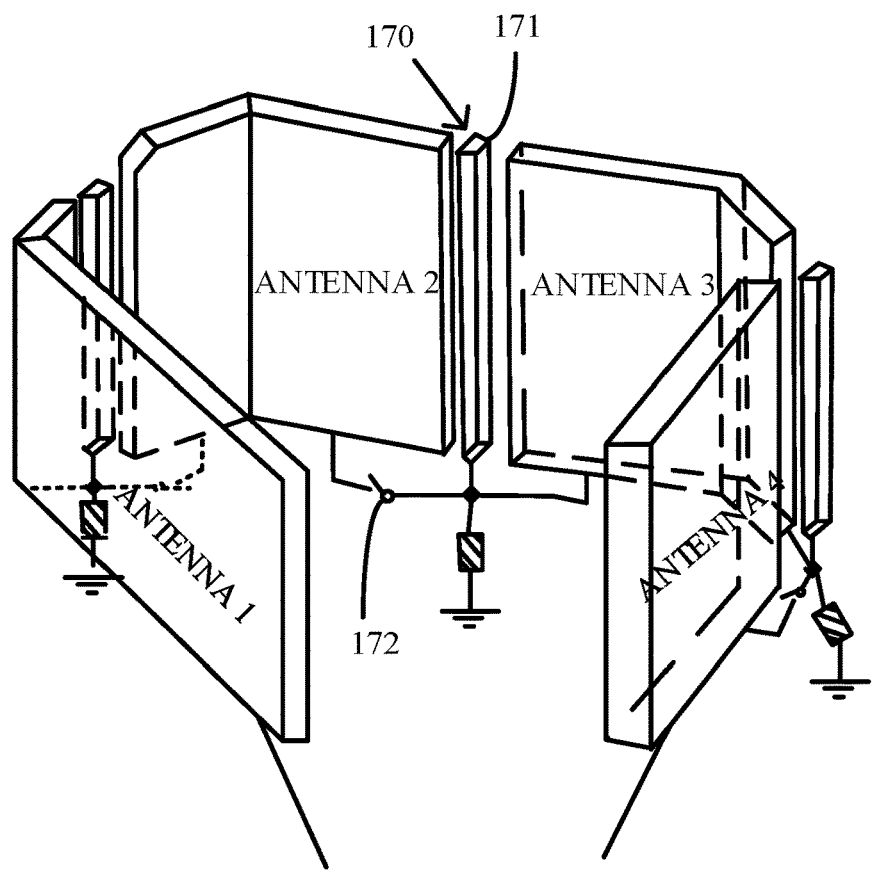
FIG. 17 is a schematic structural diagram illustrating a loop array antenna including four antennas according to an implementation of the disclosure.

For example, as illustrated in FIG. 17, the receive antenna is a loop array antenna including the four antennas described above. The four antennas include antenna 1, antenna 2, antenna 3, and antenna 4. Antenna 1 and antenna 4 are operable at both an LTE frequency band and a 5G NR frequency band, while antenna 2 and antenna 3 are only operable at the 5G NR frequency band. A port of antenna 1 and a port of antenna 4 are used as ports of the loop array antenna. Adjacent antennas are coupled via a gate circuit 170 with an isolation function. The gate circuit 170 includes a spacer 171 and a switch 172, where the spacer 171 is a conductor and the switch 172 is further coupled with a controller. The electronic device can conduct the switch 172 of each gate circuit 170 in a wireless charging mode to form a loop array antenna to receive energy. By adding the spacers 171 among the antennas, the gate circuit 170 can reduce mutual coupling among the multiple antennas of the electronic device in a normal communication mode, improve isolation among the multiple antennas, and optimize performance of the antennas. On the other hand, the multiple antennas can be coupled in series to form the loop array antenna through the switches 171, so as to better match the transmit antennas to transfer energy. Furthermore, since antenna 1 and antenna 4 have capabilities stronger than that of antenna 2 and antenna 3, the loop array antenna thus arranged can reduce energy loss in transmission as much as possible.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A multiway switch configured to be coupled with a radio frequency circuit and an antenna system of an electronic device, the multiway switch comprising:
    n T (throw) ports and four P (pole) ports, the antenna system comprising four antennas corresponding to the four P ports;
    each T port being coupled with all of the four P ports, n being an integer and 4≤n≤12;
    each P port being configured to be coupled with one antenna of the four antennas;
    any two P ports of the four P ports being configured to be coupled with different antennas of the four antennas; and
    the multiway switch being configured to support a preset function of transmitting a sounding reference signal (SRS) through the four antennas in turn.

2. The multiway switch of claim 1, wherein when n=4, the electronic device is operable in at least one mode of: a single-frequency single-transmit mode, a single-frequency dual-transmit mode, a dual-frequency single-transmit mode, and a dual-frequency dual-transmit mode.

3. The multiway switch of claim 1, wherein when n=5, the electronic device is operable in at least one mode of: a single-frequency single-transmit mode, a single-frequency dual-transmit mode, a dual-frequency single-transmit mode, and a dual-frequency dual-transmit mode.

4. The multiway switch of claim 1, wherein when n=6, the electronic device is operable in at least one mode of: a single-frequency dual-transmit mode, a dual-frequency single-transmit mode, and a dual-frequency dual-transmit mode.

5. The multiway switch of claim 1, wherein when n=7, the electronic device is operable in at least one mode of: a dual-frequency single-transmit mode and a dual-frequency dual-transmit mode.

6. The multiway switch of claim 1, wherein when n=8, the electronic device is operable in at least one mode of: a dual-frequency single-transmit mode and a dual-frequency dual-transmit mode.

7. The multiway switch of claim 1, wherein when n=9, the electronic device is operable in at least one mode of: a dual-frequency single-transmit mode and a dual-frequency dual-transmit mode.

8. The multiway switch of claim 1, wherein when n=10, the electronic device is operable in at least one mode of: a dual-frequency single-transmit mode and a dual-frequency dual-transmit mode.

9. The multiway switch of claim 1, wherein when n=11, the electronic device is operable in a dual-frequency dual-transmit mode.

10. The multiway switch of claim 1, wherein when n=12, the electronic device is operable in a dual-frequency dual-transmit mode.

11. The multiway switch of claim 1, wherein:
the electronic device is operable in a single-frequency single-transmit mode and the radio frequency circuit logically comprises one transmitter circuit and four receiver circuits;
the radio frequency circuit physically comprises at least one independent circuit module; and
the at least one independent circuit module has receive ports and at least one of a transmit-receive port and a transmit port, the receive ports and the at least one of the transmit-receive port and the transmit port are configured to be coupled with the n T ports.

12. The multiway switch of claim 1, wherein:
the electronic device is operable in a single-frequency dual-transmit mode and the radio frequency circuit logically comprises two transmitter circuits and four receiver circuits;
the radio frequency circuit physically comprises at least two independent circuit modules; and
the at least two independent circuit modules have receive ports and at least one of a transmit-receive port and a transmit port, the receive ports and the at least one of the transmit-receive port and the transmit port are configured to be coupled with the n T ports.

13. The multiway switch of claim 1, wherein:
the electronic device is operable in a dual-frequency single-transmit mode and the radio frequency circuit logically comprises two transmitter circuits and eight receiver circuits;
the radio frequency circuit physically comprises at least one independent circuit module; and
the at least one independent circuit module has receive ports and at least one of a transmit-receive port and a transmit port, the receive ports and the at least one of the transmit-receive port and the transmit port are configured to be coupled with the n T ports.

14. The multiway switch of claim 1, wherein:
the electronic device is operable in a dual-frequency dual-transmit mode and the radio frequency circuit logically comprises four transmitter circuits and eight receiver circuits;
the radio frequency circuit physically comprises at least two independent circuit modules; when there is an independent circuit module including two power amplifiers (PA) of the at least two independent circuit modules, the two PAs of the independent circuit module are operable at different frequency bands; and
the at least two independent circuit modules have receive ports and at least one of a transmit-receive port and a transmit port, the receive ports and the at least one of the transmit-receive port and the transmit port are configured to be coupled with the n T ports.

15. A radio frequency system, comprising:
an antenna system, a radio frequency circuit, and a multiway switch coupled with the radio frequency circuit and the antenna system;
the multiway switch comprising n T (throw) ports and four P (pole) ports, and the antenna system comprising four antennas corresponding to the four P ports;
each T port being coupled with all of the four P ports, n being an integer and $4 \leq n \leq 12$;
each P port being configured to be coupled with one antenna of the four antennas;
any two P ports of the four P ports being configured to be coupled with different antennas of the four antennas; and
the multiway switch being configured to support a preset function of transmitting a sounding reference signal (SRS) through the four antennas in turn.

16. The radio frequency system of claim 15, wherein:
the four antennas comprise a first antenna, a second antenna, a third antenna, and a fourth antenna, wherein
the first antenna and the fourth antenna are antennas operable at a long term evolution (LTE) frequency band and a fifth generation new radio (5G NR) frequency band; and
the second antenna and the third antenna are antennas only operable at the 5G NR frequency band; and
the antenna system further comprises a first combiner and a second combiner, wherein
the first combiner has a first port coupled with the first antenna, a second port coupled with a first receive path in LTE 4×4 multiple-input multiple-output (MIMO) configuration of the electronic device, and a third port coupled with a corresponding P port of the multiway switch; and
the second combiner has a first port coupled with the fourth antenna, a second port coupled with a second receive path in the LTE 4×4 MIMO configuration of the electronic device, and a third port coupled with a corresponding P port of the multiway switch.

17. The radio frequency system of claim 15, wherein:
the four antennas comprise a first antenna, a second antenna, a third antenna, and a fourth antenna, wherein
the first antenna and the fourth antenna are antennas operable at a long term evolution (LTE) frequency band and a fifth generation new radio (5G NR) frequency band; and
the second antenna and the third antenna are antennas only operable at the 5G NR frequency band; and the antenna system further comprises a first single-pole double-throw (SPDT) switch and a second SPDT switch, wherein
- the first SPDT switch has a first port coupled with the first antenna, a second port coupled with a first receive path in LTE 4×4 MIMO configuration of the electronic device, and a third port coupled with a corresponding P port of the multiway switch; and
- the second SPDT switch has a first port coupled with the fourth antenna, a second port coupled with a second receive path in the LTE 4×4 MIMO configuration of the electronic device, and a third port coupled with a corresponding P port of the multiway switch.

18. A wireless communication device, comprising:
an antenna system, a radio frequency transceiver, a radio frequency circuit coupled with the radio frequency transceiver, and a multiway switch coupled with the radio frequency circuit and the antenna system;
the multiway switch comprising n T (throw) ports and four P (pole) ports, and the antenna system comprising four antennas corresponding to the four P ports;
each T port being coupled with all of the four P ports, n being an integer and 4≤n≤12;
each P port being configured to be coupled with one antenna of the four antennas;
any two P ports of the four P ports being configured to be coupled with different antennas of the four antennas; and
the multiway switch being configured to support a preset function of transmitting a sounding reference signal (SRS) through the four antennas in turn.

* * * * *